United States Patent [19]
Bolger

[11] Patent Number: 5,471,393
[45] Date of Patent: Nov. 28, 1995

[54] DRIVER'S ASSOCIATE: A SYSTEM FOR VEHICLE NAVIGATION AND DRIVING ASSISTANCE

[76] Inventor: Joe Bolger, 1404 Alegria, Austin, Tex. 78757

[21] Appl. No.: 187,743

[22] Filed: Jan. 26, 1994

[51] Int. Cl.[6] .................................................. G06F 17/00
[52] U.S. Cl. ........................ 364/450; 364/443; 364/449; 73/178 R
[58] Field of Search .................................... 364/443, 449, 364/450, 582; 73/178 R; 340/988, 990, 995

[56] References Cited

U.S. PATENT DOCUMENTS

| | | | |
|---|---|---|---|
| 4,520,445 | 5/1985 | Keearns | 364/450 |
| 5,272,639 | 12/1993 | McGuffin | 364/449 |
| 5,307,278 | 4/1994 | Hermans et al. | 364/450 |
| 5,317,514 | 5/1994 | Bancroft et al. | 364/449 |

*Primary Examiner*—Kevin J. Teska
*Assistant Examiner*—Susan Wieland
*Attorney, Agent, or Firm*—Steven D. Smit; Joseph P. Lally; David G. Henry

[57] ABSTRACT

The Driver's Associate assists a driver of a vehicle to more efficiently reach a desired destination, to record the route driven, and to provide driving summary reports. The present invention uses a unique method for tracking the dead-reckoned coordinate of the vehicle by using a sum-of-squares or $\chi^2$ minimization algorithm for plotting the navigation route, tracking the vehicle through the road map database, and for normalizing the vehicle's location between the dead-reckoned coordinate and the roadway projected coordinate. The present invention also uses a Singular Value Decomposition method for optimizing the normalization process so that we can track a vehicle's location more accurately than other navigation devices.

8 Claims, 41 Drawing Sheets

INDEX OF THE FOLLOWING 9 PAGES REQUIRED TO ILLUSTRATE FIGURE 3.

| 3A | 3B | 3C |
|----|----|----|
| 3D | 3E | 3F |
| 3G | 3H | 3I |

Fig. 3INDEX

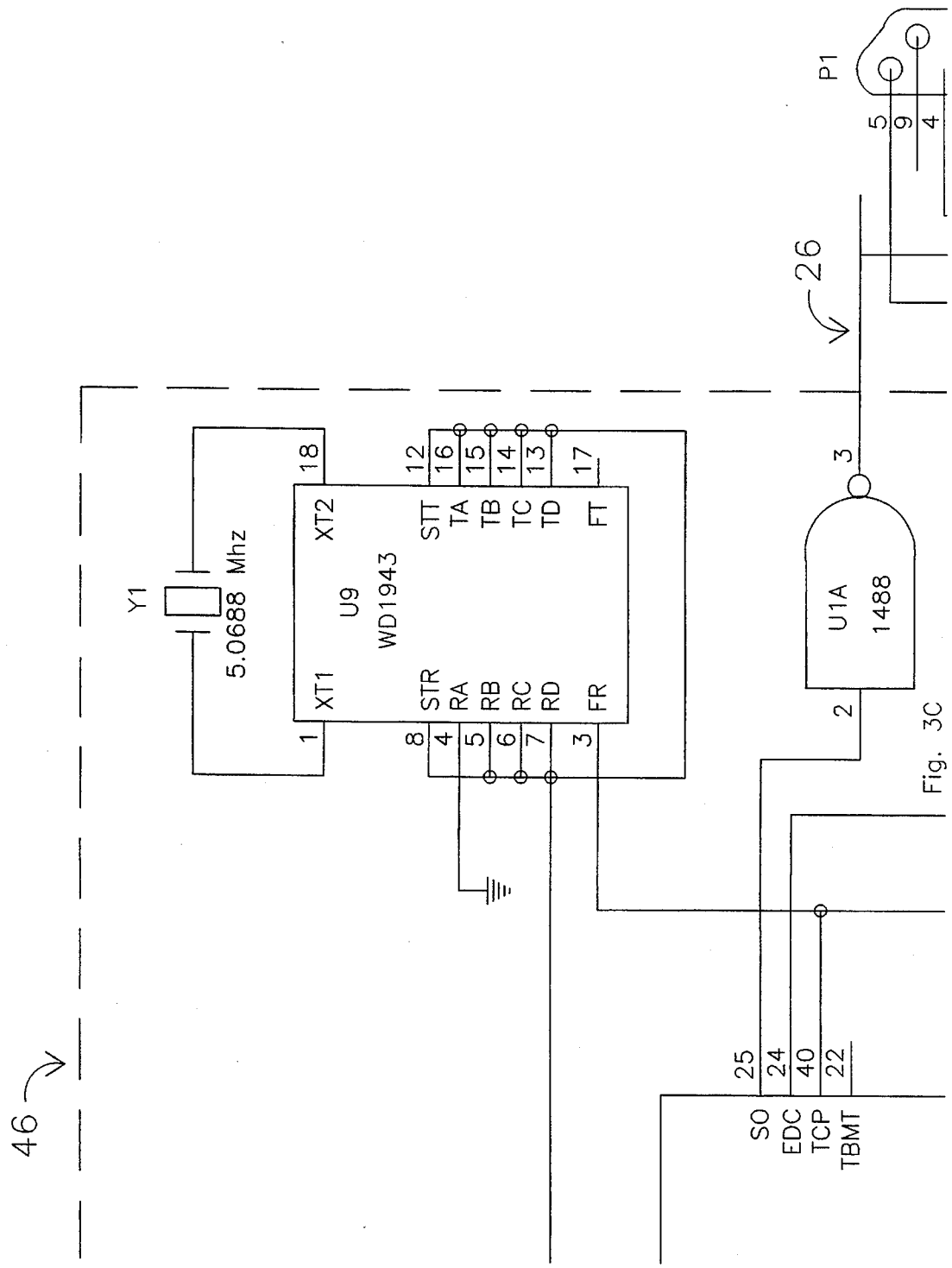

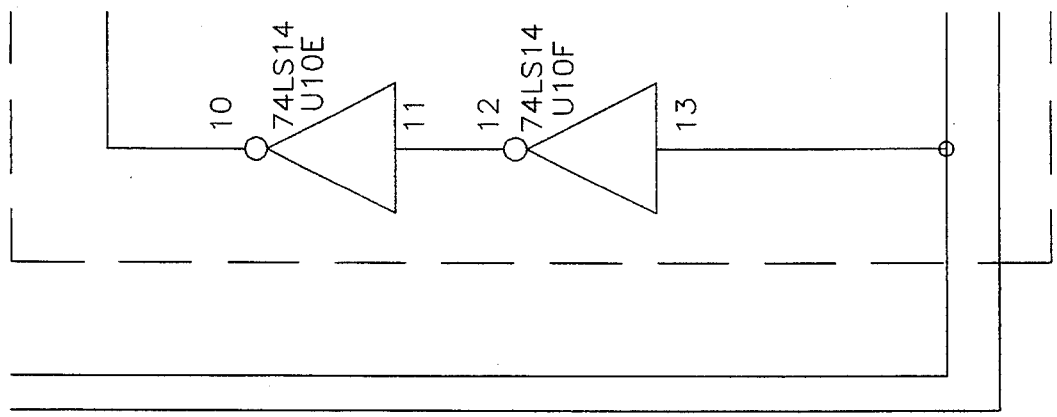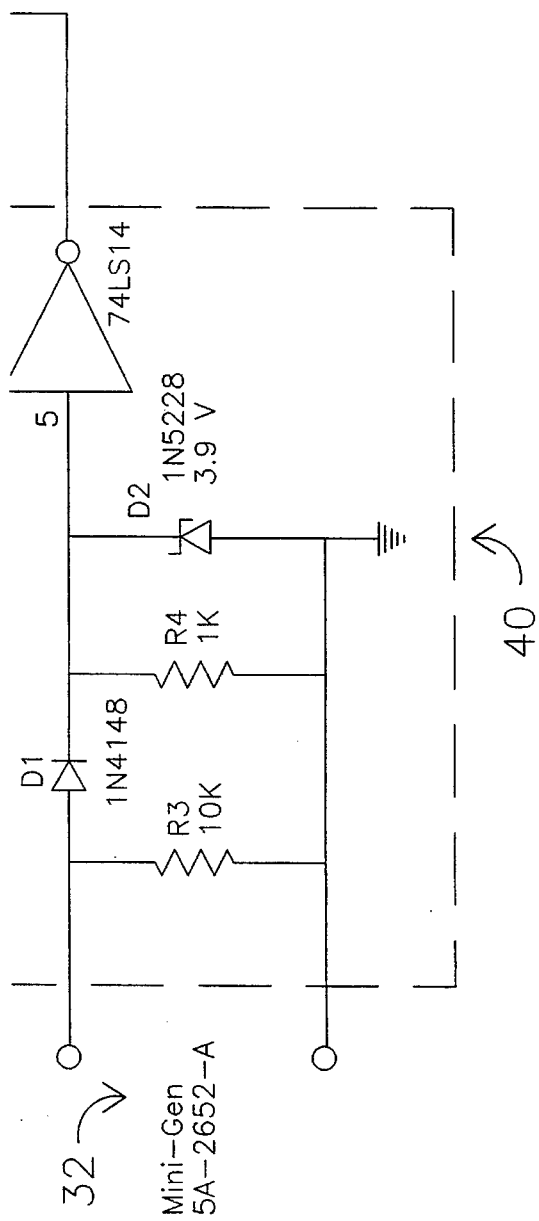
Fig. 3G

INDEX OF THE FOLLOWING 13 PAGES REQUIRED TO ILLUSTRATE FIGURE 10.

| 10A | 10B | 10C | 10D |
|-----|-----|-----|-----|
| 10E | 10F | 10G | 10H |
| 10I | 10J | 10K | 10L |
| 10M |     |     |     |

Fig. 10INDEX

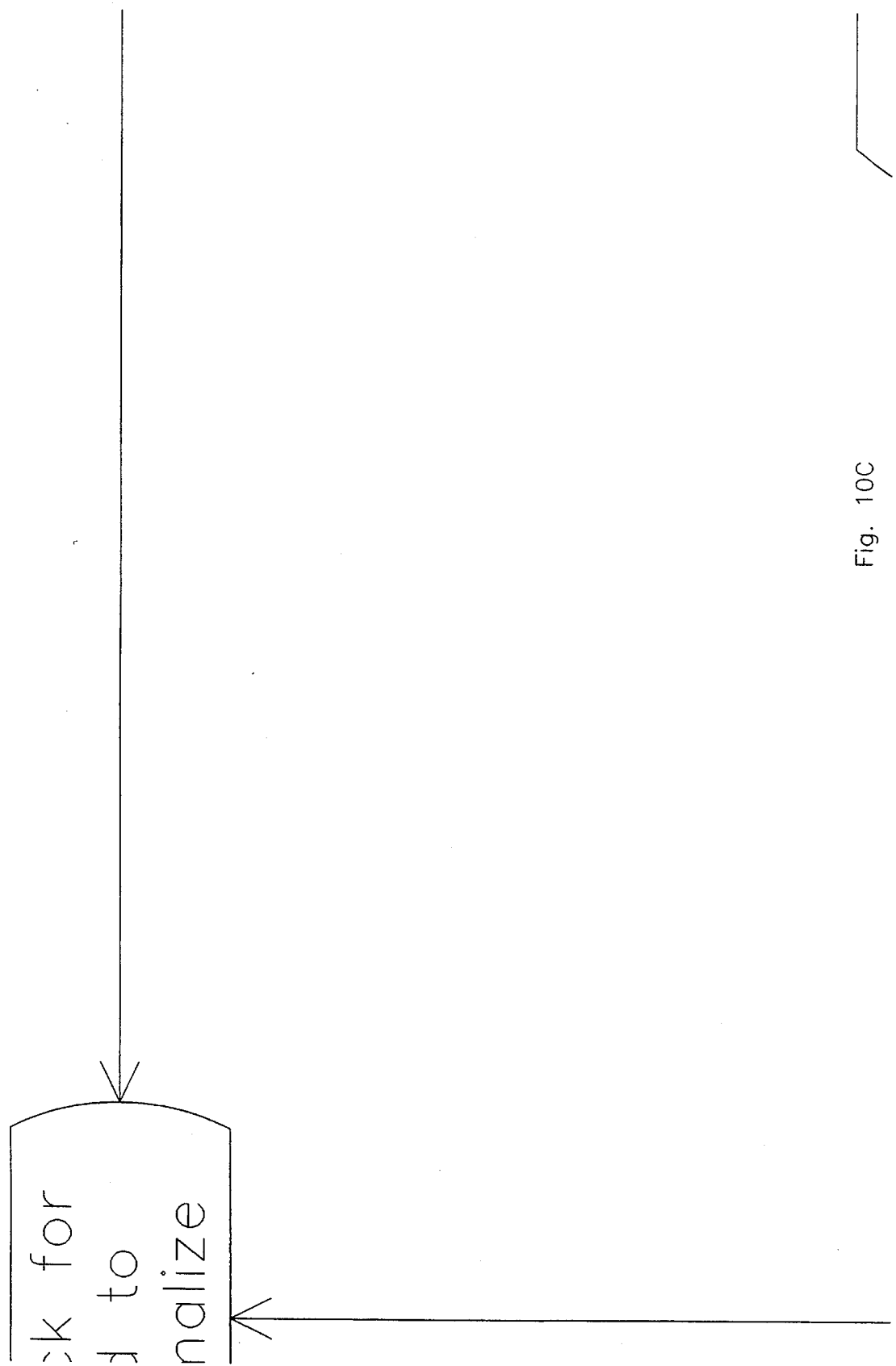

Calculate a new Dead-Reckoning Location according to:

$$\psi = \text{MOD}((\Theta_i - \Theta_{i-1}), 180°)$$

$$D = 2 \cdot \left(\frac{C_i}{\psi}\right) \cdot \text{SIN}\left(\frac{\psi}{2}\right)$$

$$x_i = x_{i-1} + D \cdot \text{COS}\left(90° - \left(\Theta_{i-1} + \frac{\psi}{2}\right)\right)$$

$$y_i = y_{i-1} + D \cdot \text{SIN}\left(90° - \left(\Theta_{i-1} + \frac{\psi}{2}\right)\right)$$

Fig. 10E

Fig. 10G $$\sum_{i=1}^{?} \left[ \frac{(x_i - x_i')^2}{\sigma_x^2} + \frac{(y_i - y_i')^2}{\sigma_y^2} + \frac{(\Theta_i - \Theta_i')^2}{\sigma_\Theta^2} \right]$$

Calculate Chi-Squared for each route according to:

Project down all Possible Routes Until the Distance Traveled is Reached

Fig. 10H

ɔning
and
nates by
q·F_i)·sin(Θ_i'))
  of:

$$\frac{q \cdot F_i) \cdot \cos(\Theta_i')]^2}{}$$

$$\frac{+q \cdot F_i) \cdot \sin(\Theta_i')]^2}{{}^2_y}$$

After Normalization

DRIVER'S ASSOCIATE: A SYSTEM FOR VEHICLE NAVIGATION AND DRIVING ASSISTANCE

BACKGROUND OF THE INVENTION

1. Field of the Invention

This patent application pertains to automobile navigation systems. More particularly, this patent application pertains to automobile navigation systems that use dead reckoning techniques for determining the automobile's location.

2. Description of the Related Art

Dead reckoning techniques using a method of sample measurements of compass direction and distance traveled quickly produce errors too excessive to navigate a vehicle on streets and highways. There are several patents in the art using normalization methods that correlate the dead reckoned coordinates to the roadway projected coordinates of the road map database. These patents, however, do not provide an optimal solution. In fact, they usually do not produce workable solutions except in the most simple cases, and they fail to overcome the inherent errors produced when correlating the dead reckoning path to the road map database with the result that numerous manual corrections must be made to resynchronize the current location of the automobile with the road map database.

OBJECT AND SUMMARY OF THE INVENTION

An object of the present invention is to provide the driver of a vehicle navigational assistance in reaching any desired location.

A feature of this invention is the use of a sum-of-squares or $\chi^2$ minimization algorithm for plotting the navigation route, tracking the vehicle through the road map database, and for normalizing the vehicle's location between the dead-reckoned coordinates and the roadway projected coordinates of the road map database.

An advantage to using the sum-of-squares minimization or $\chi^2$ minimization algorithm is that we can track a vehicle's location more accurately than other similar devices that only use a simple determinate method for dead reckoning.

The Driver's Associate is a novel and unique combination of a digital compass, electronic distance traveled sensor, computer, and software that provides a complete system for vehicle navigation and driving assistance. The digital compass and the electronic distance traveled sensor attach to the vehicle allowing collection of the data from the respective components as input to a dead reckoning algorithm that in turn produces a series of vehicle coordinate locations. When the driver designates a destination location, the system determines the appropriate navigation route based on either the shortest driving distance or the fastest estimated travel time. The driver can of course modify the suggested route if desired. As the driver travels along a route, the system will give directions through either audible or visual instructions. If the driver deviates from the planned navigation route, the system automatically develops a new route. The system also records the driving activity for later reviewing, thereby making it possible to monitor business vehicle usage.

The present invention emphasizes the need to reconcile the dead-reckoned coordinates to the corresponding road way coordinates projected upon the road map database. A well known fact in the art is that neither dead reckoning data nor a road map database correctly represents the exact route driven. However, the two sets of data when properly combined and reconciled can provide enough information to allow reliable prediction of the navigation route through the correct street and highway intersections. The present invention requires a known starting location to locate correctly the vehicle in the road map database. The navigation system can use a previously tracked position, or if this is unavailable, the system can even use the current street address. Through use of the road map database, the present invention converts the street address into a road way coordinate location. The system next uses the collection of coordinates obtained from dead reckoning and roadway projected (from the road map database) to establish a $\chi^2$ value that when minimized produces the best match between the road map database location and the dead reckoning path location. The definition of the normalization function that corrects for errors between the two sets of coordinates is of critical importance in predicting the correct location. This normalization function includes a coordinate offset for the dead reckoning route, a constant path offset, and an offset proportional to the change in vehicle heading. These offsets allow the normalization function to reconcile the cutting of corners and other variations in the true route from the road way location of the road map database. Since the corrections are linear except for discontinuities at the intersections, the present invention uses Singular Value Decomposition to arrive at the optimum solution or the minimum of $\chi^2$.

The Driver's Associate assists the driver of a vehicle to more efficiently reach a desired destination, records the route driven, and provides driving summary reports. The present invention's tracking algorithm employs a unique and robust method of correlation between the measured vehicle heading and distance traveled and a digitized road map database to locate the vehicle as it travels. In providing a superior system for vehicle navigation assistance, the tracking process begins by defining a generalized method of determining the navigation route through a sum-of-squares or $\chi^2$ minimization. To compensate for the inherent errors produced by a typical dead reckoning system, this invention additionally introduces a normalization function that matches the dead reckoning route to the roadway projected or road map database route by optimizing the normalization process by using a Singular Value Decomposition (SVD) method in conjunction with the sum-of-squares method,

DESCRIPTION OF THE DRAWINGS

To further aid in understanding the invention, the attached drawings help illustrate specific features of the invention. The following is a brief description of the attached drawings.

DETAILED DESCRIPTION OF THE INVENTION

Consideration of the following example, which is purely exemplary, further clarifies the use of the invention.

Figure 1:
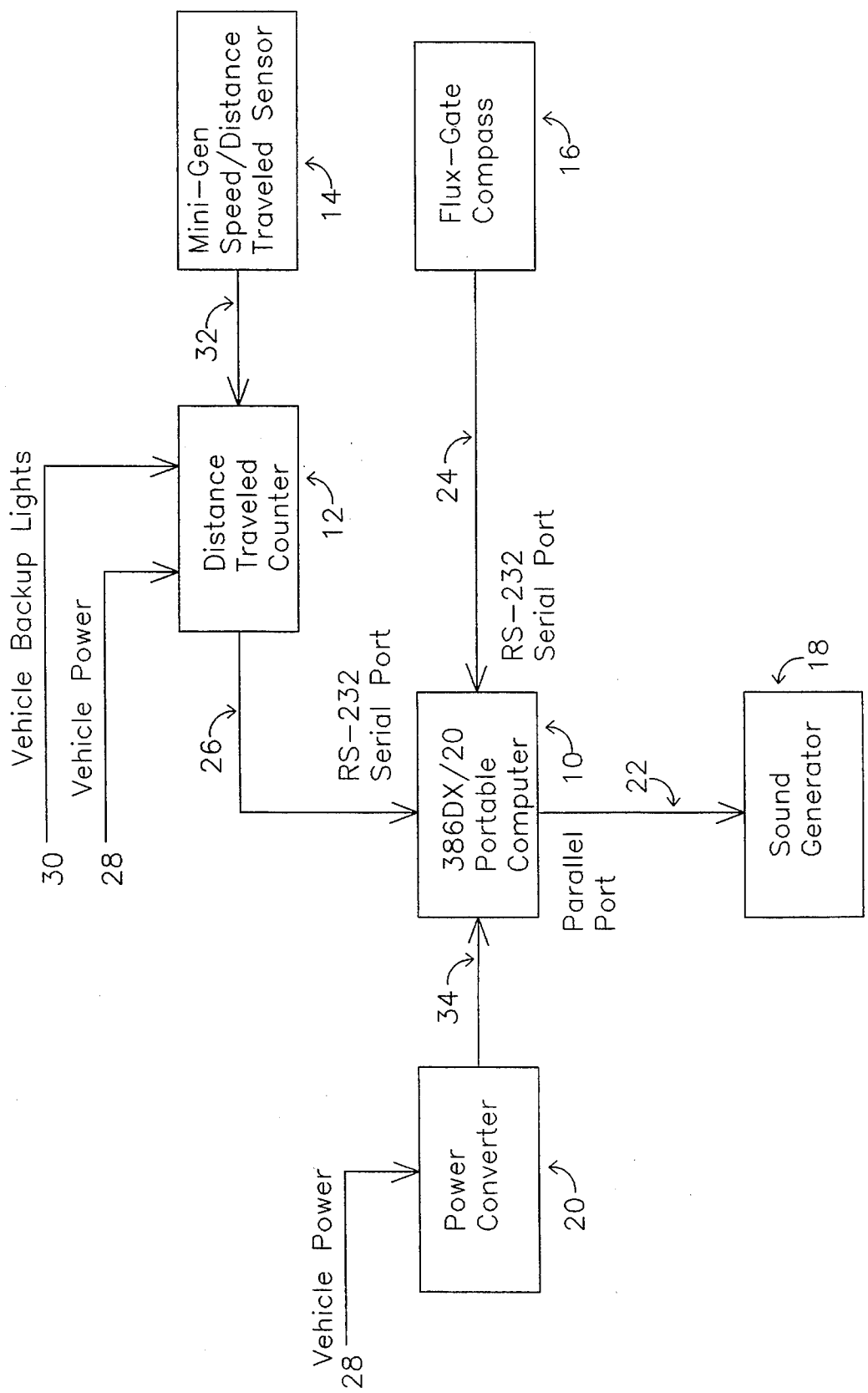
FIG. 1 is a block diagram of the hardware component of the invention.

The preferred embodiment of the system includes, referring now to FIG. 1, a speed sensor 14, a distance traveled counter 12, a digital compass 16, a portable computer 10, a speech synthesizer 18, and appropriate power conversion electronics 20. The digital compass 16 is a KVH Industries model C100 automatically compensating fluxgate compass. To reduce the magnetic disturbance from the vehicle, the compass's sensor mounts on a short antenna external to the vehicle. The portable computer 10 interfaces to both the distance traveled sensor and the compass through RS-232 interface ports 24 and 26. The navigation software reads the distance traveled and the compass heading every 1.5 seconds when the system is in tracking mode. The system provides verbal prompts to the driver through a speech synthesizer 18 attached to the computer's printer port 22.

One of the most essential capabilities to an automotive navigation system is the ability to measure the distance traveled by the vehicle. Previous efforts to achieve this measurement used sensors measuring the instantaneous velocity of the vehicle. Using a velocity sensor requires us to assume that the velocity was constant from one measurement to the next with multiplication of the time duration between measurements to convert to distance traveled. This process not only introduces errors into the calculation of the distance traveled, but this also makes the detection of reverse motion extremely difficult. A better solution would have the navigation system read the distance traveled directly from some sensor, since distance is measurement sought, not speed. Of crucial importance to the increased accuracy of the navigation system is for the distance traveled sensor to recognize the difference between traveling forward and traveling in reverse. The preferred embodiment includes a "Mini-Gen" Signal Generator from Synchro-Start Products Inc. as the speed sensor/distance traveled sensor 14 that connects in-line with the vehicle speedometer cable and generates an electrical sine wave with a frequency proportional to the speed of the wheel rotation. U.S. Pat. No. 4,074,157 to Lace fully discusses the operation of the Mini-Gen Signal Generator and is incorporated herein by reference.

Figure 2:
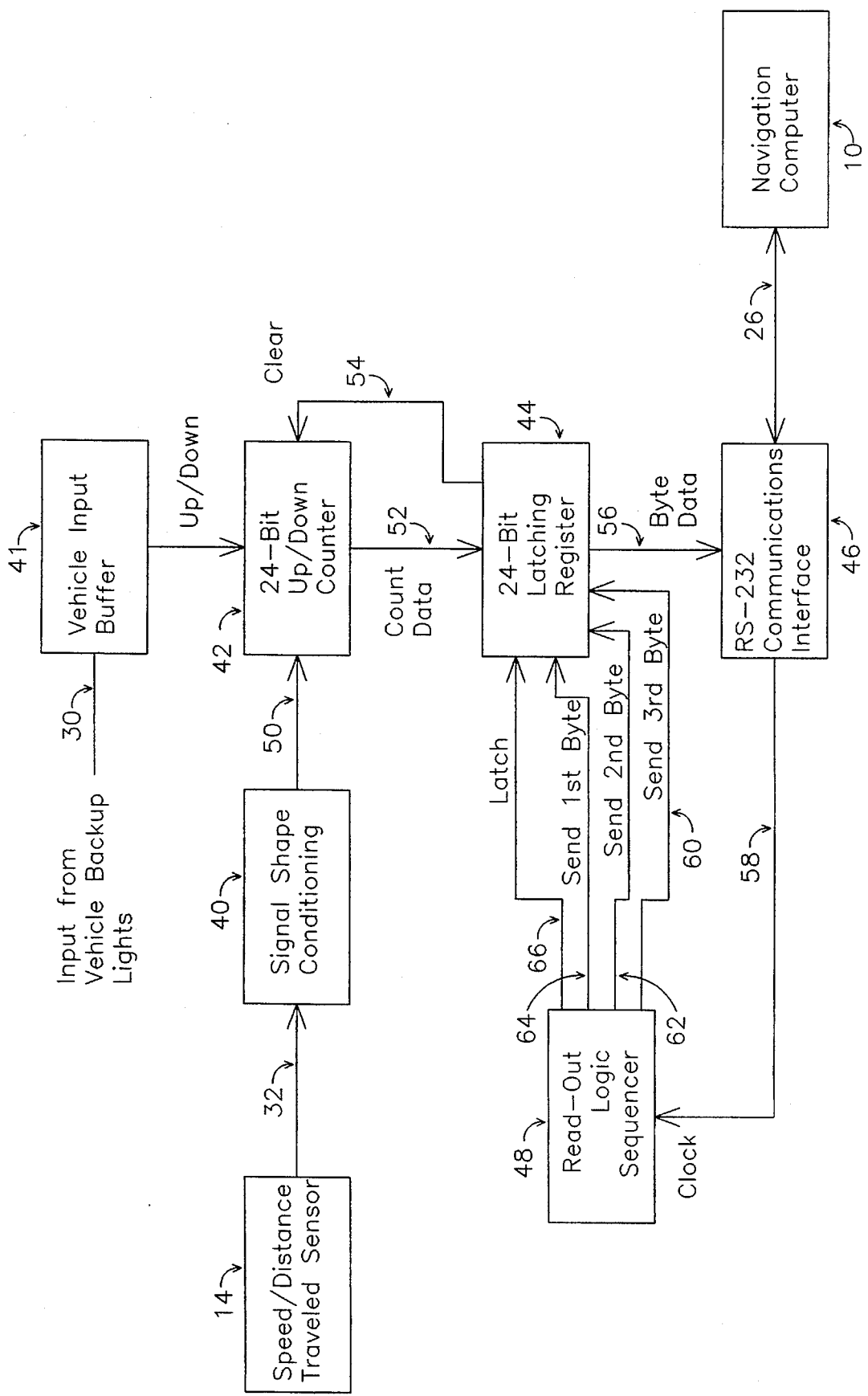
FIG. 2 is a block diagram of the distance traveled component of the invention.
Figure 3A:
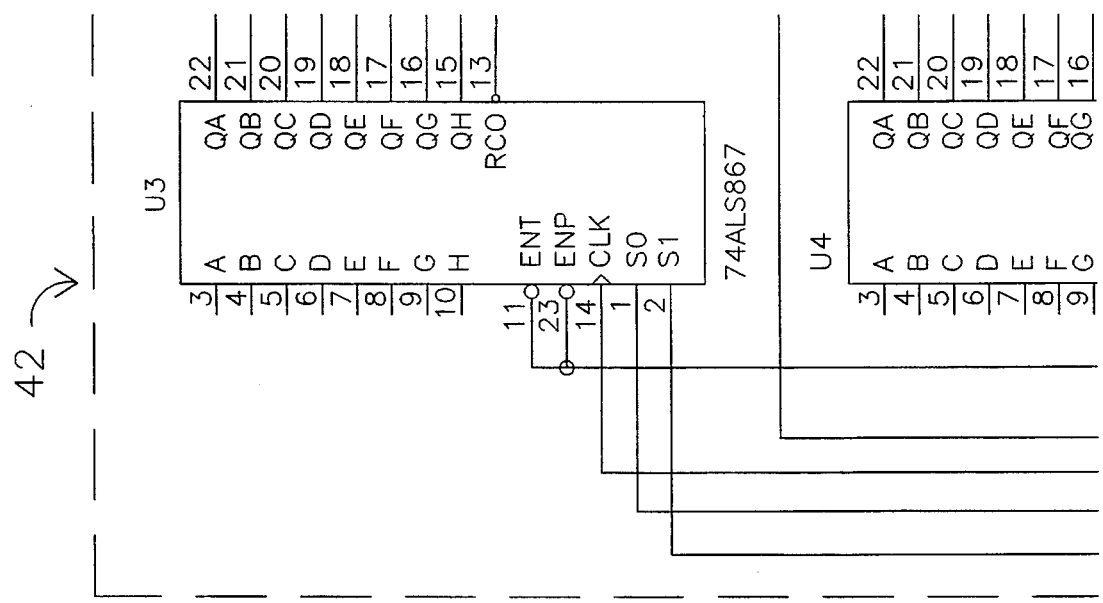
FIG. 3 is a schematic diagram of the distance traveled component of the invention.
Figure 3B:
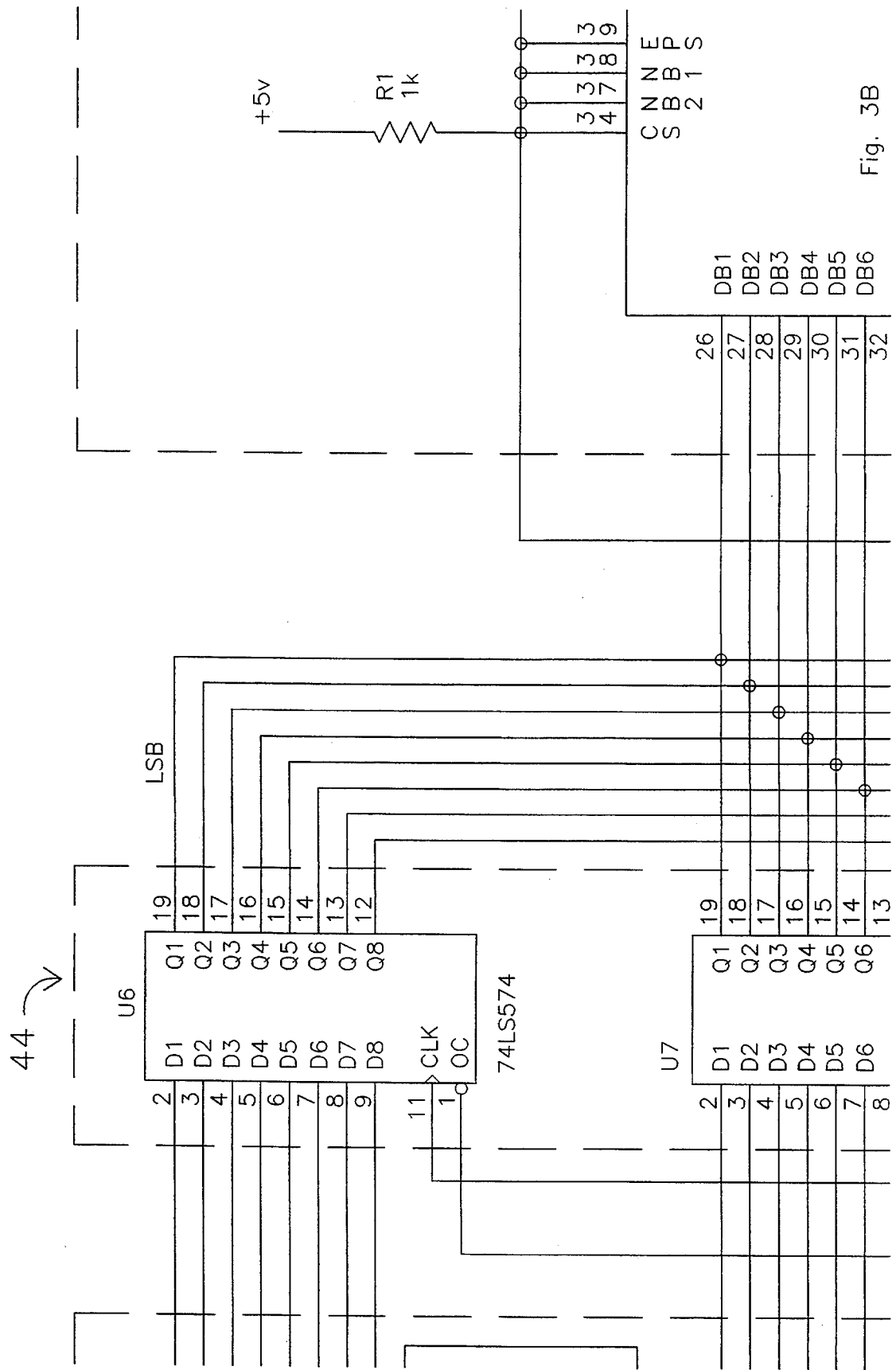
Figure 3D:
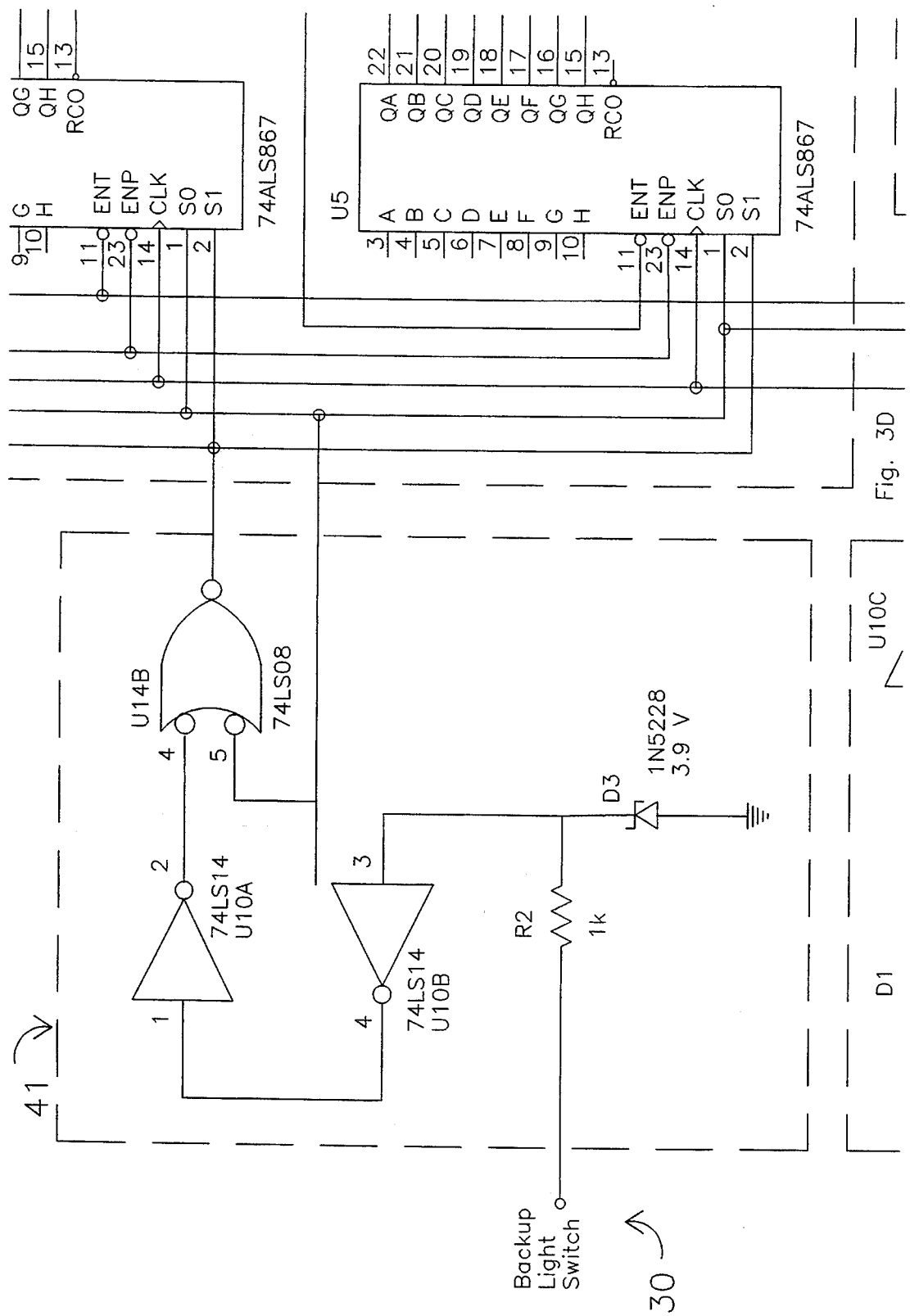
Figure 3E:
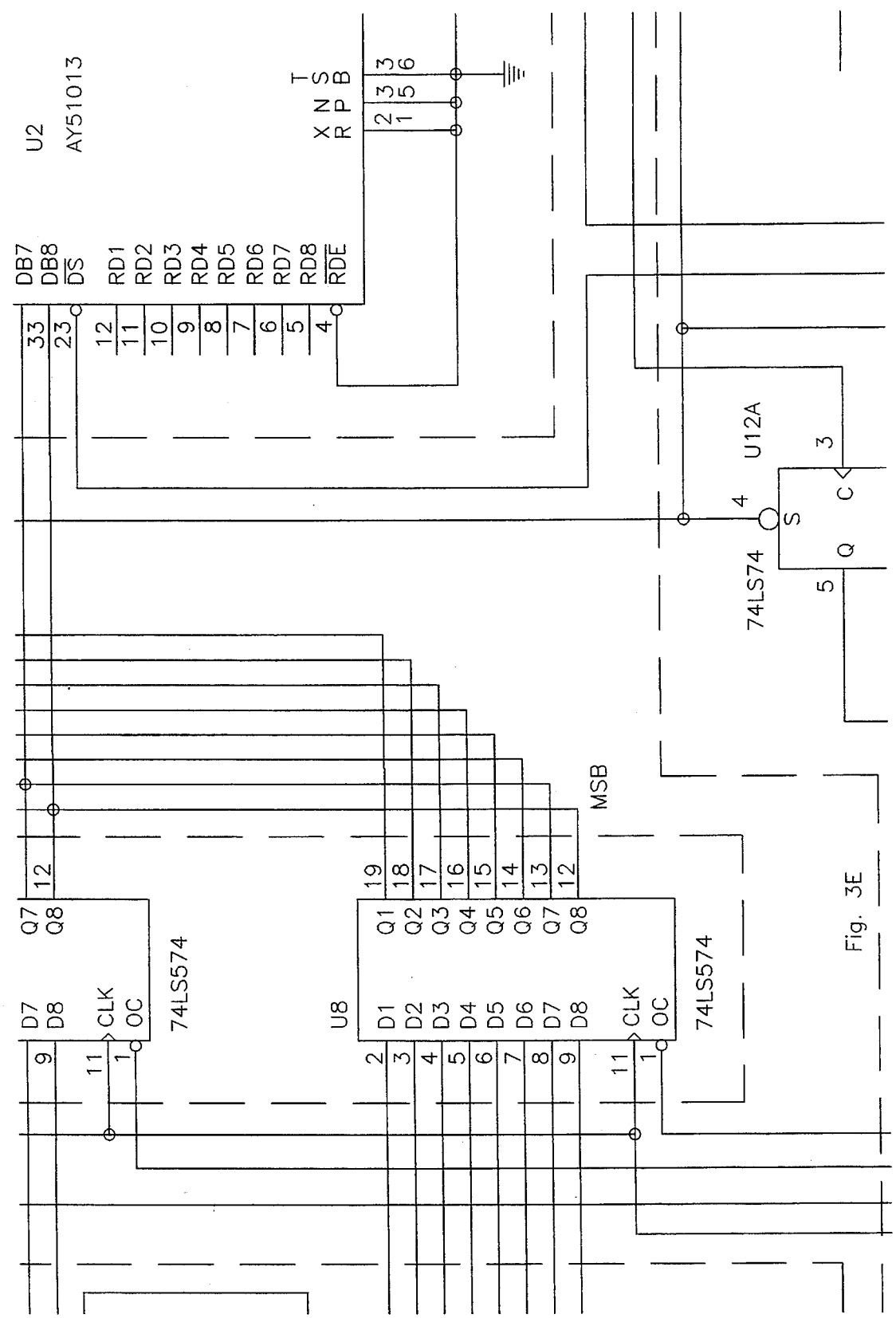
Figure 3F:
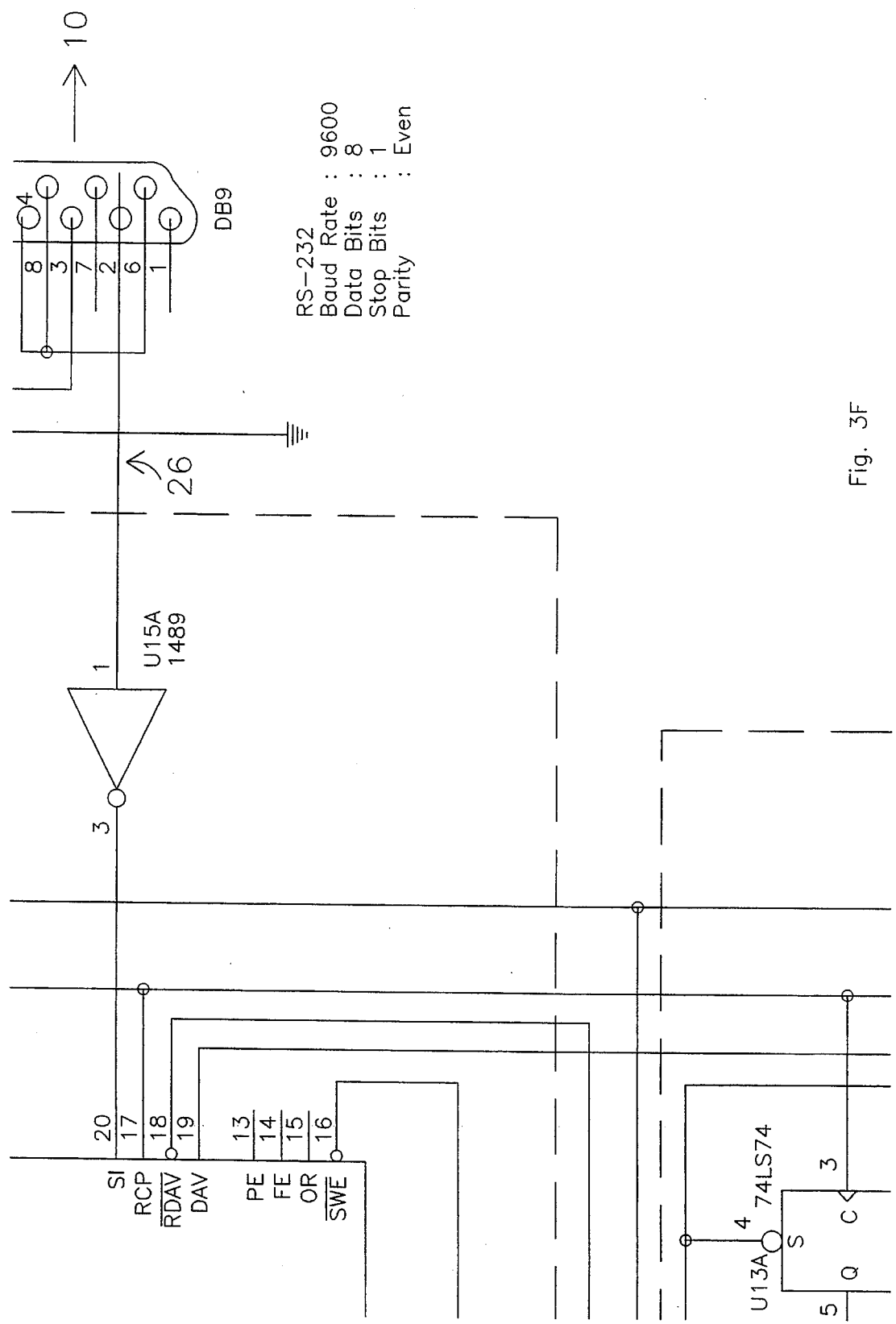
Figure 3H:
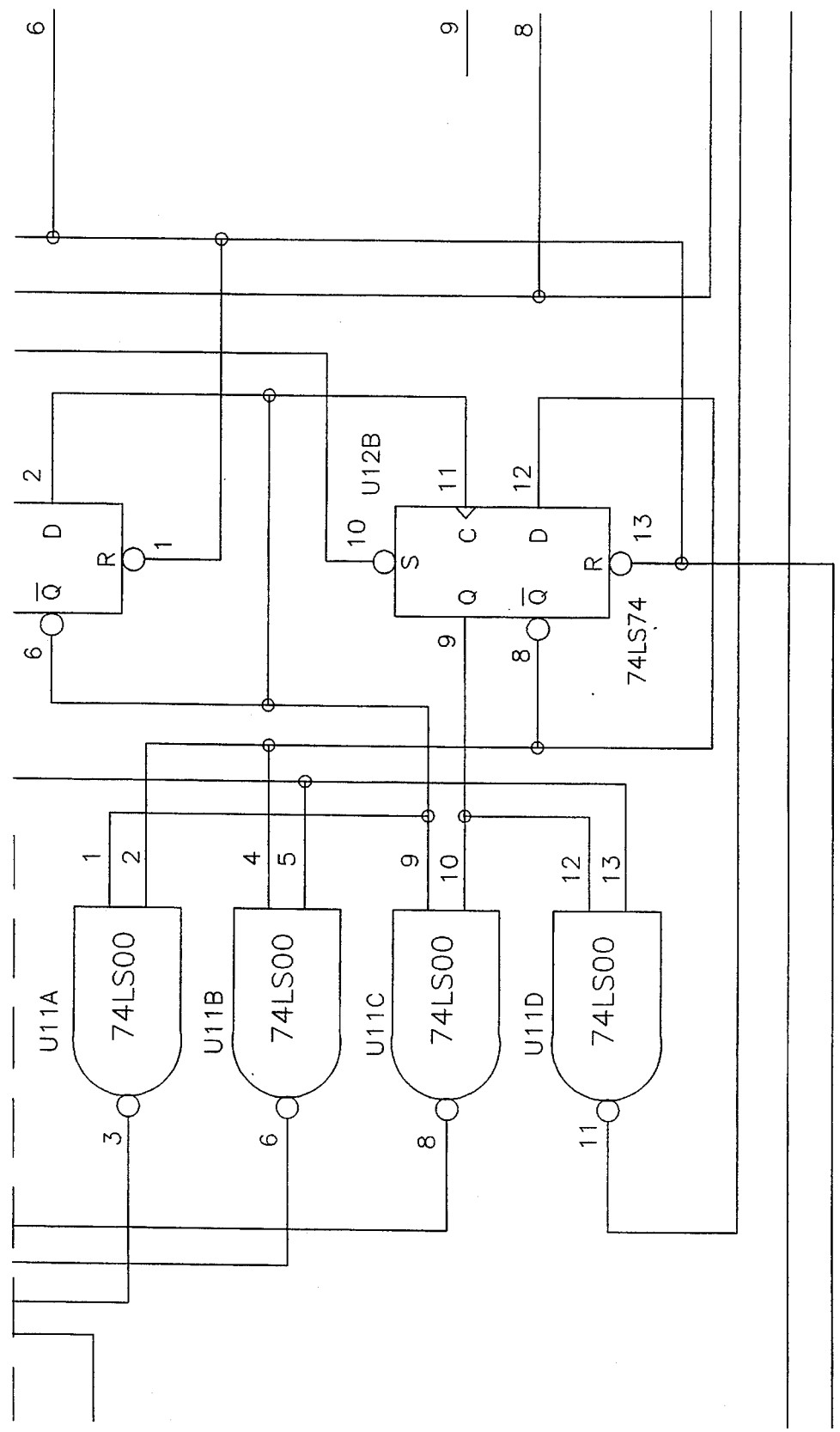
Figure 31:
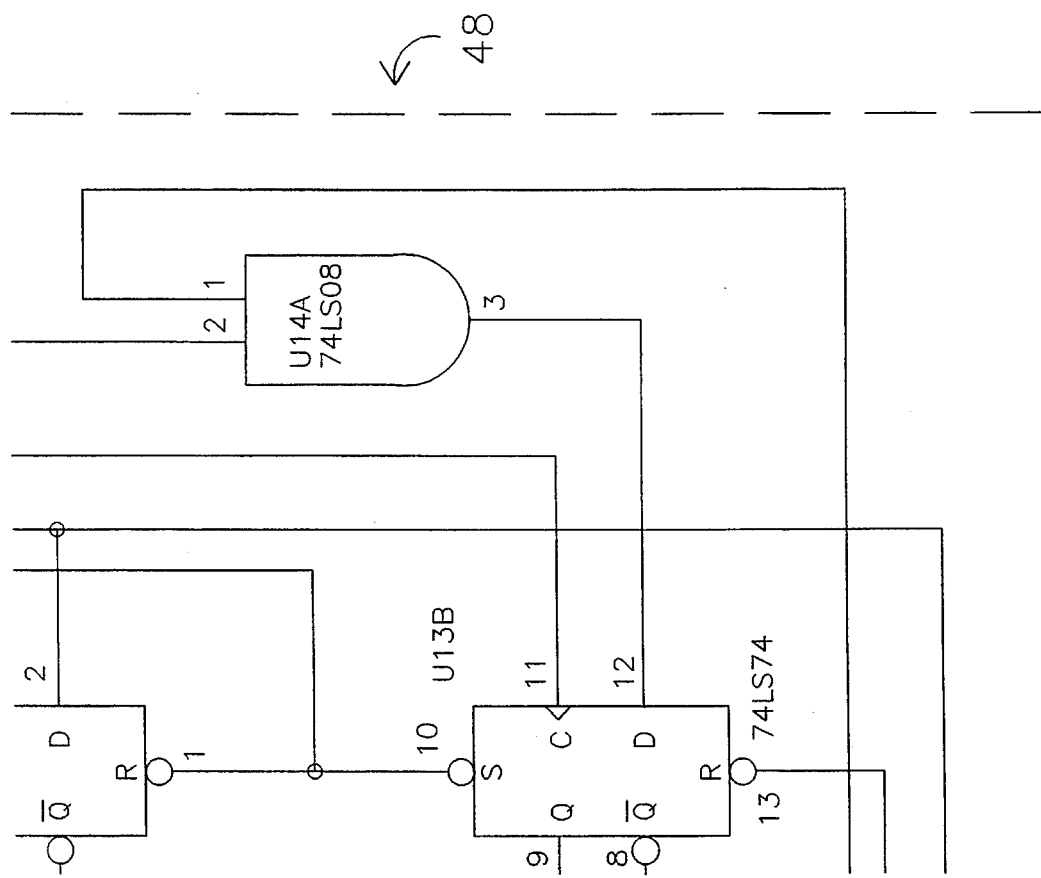

FIG. 2 shows the functional block diagram of the distance traveled counter 12 of FIG. 1 that digitizes the sine wave and counts these digitized pulses from the speed/distance traveled sensor 14. A 24-bit Up/Down counter 42 receives the digitized pulses in combination with the electrical signal 30 from the vehicle backup lights. Naturally if the vehicle is traveling backwards, the backup lights are on. Traveling forward increments the Up/Down counter 42, while traveling backward decrements the counter. Depending upon the gear ratio of the vehicle's transmission and differential, the speed/distance traveled sensor 14 generates approximately forty sine wave pulses for each rotation of the wheels giving an excellent accuracy of about 5.3 centimeters per pulse.

The distance traveled counter 12 of FIG. 1 interfaces to a serial port 26 on the navigation computer 10. If the distance traveled counter receives any input from the navigation computer, the counter will send a 3 byte readout sequence to the computer. The readout sequence first loads the value of the Up/Down counter 42 into a 24-bit latching register 44 before clearing and resetting the counter 42 to zero. The data stored in the latch register 44 goes to the navigation computer 10 that then converts this information into the appropriate units of distance traveled. FIG. 3 is a schematic of the distance traveled counter.

Figure 4A:
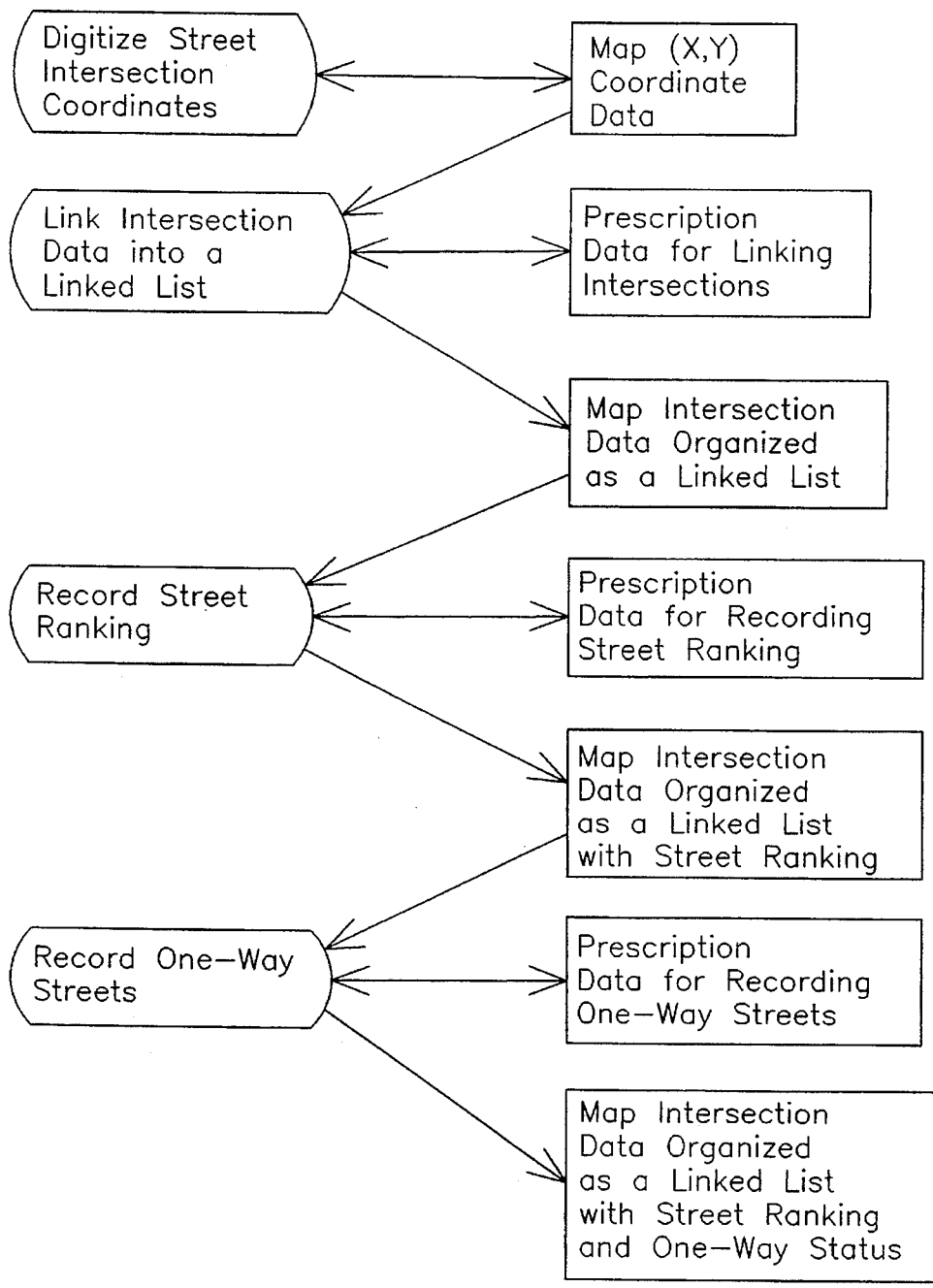
FIG. 4 illustrates the process for making the road map database used in the invention.
Figure 4B:
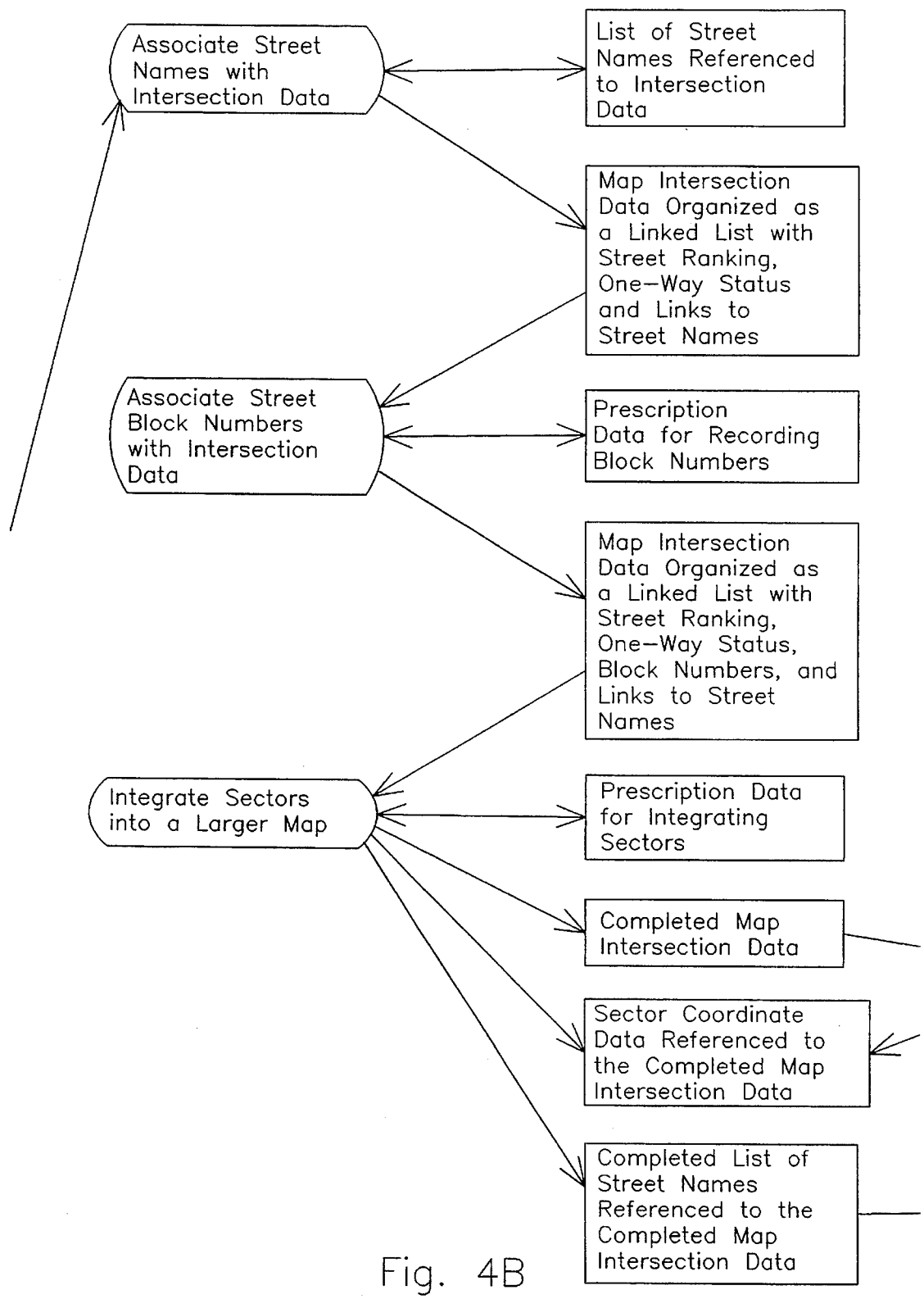
Figure 4C:
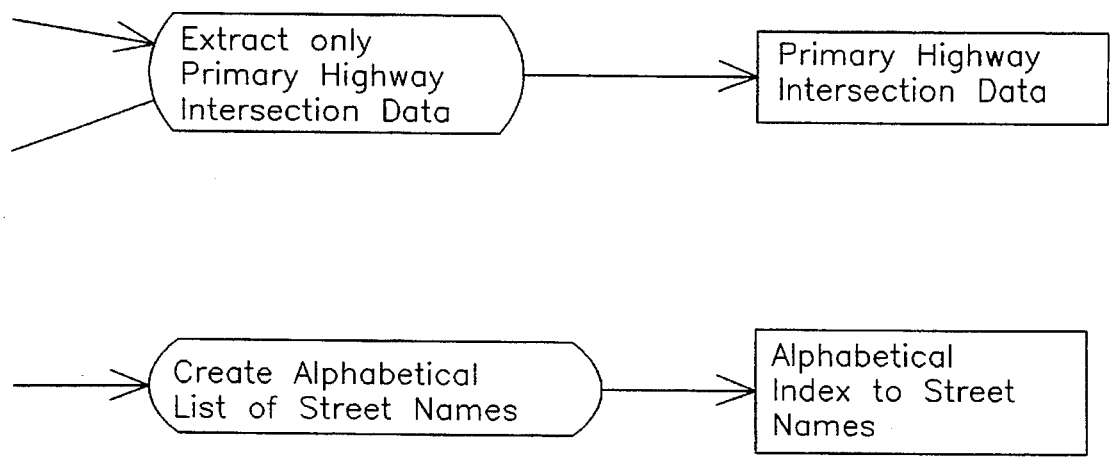

An integral part of any vehicle navigation system is the road map database. For tracking a vehicle in any navigation system to be accurate, we must first have the entire road system digitized into a road map database. Information about the road system must include coordinate locations that describe the roads, the connectivity between intersections, street names, block numbers, road size classification, and one-way status. Creating a road map database requires the map creator to perform a series of operations on many small geographical patches, with the final step being to stitch the patches into a completed road map database. The primary map input used in the present invention is from topographic maps of scale 1:24,000. FIG. 4 illustrates the process required to create a road map database where ovals denote processes and rectangles denote data structures. To keep track of the constantly changing location of the vehicle, we optimize the road map database for both speed and storage limitations. The preferred embodiment of this invention requires between 8 to 12 kilobytes of storage space per square kilometer of typical city streets.

The method for storing the road map information is a collection of lists organized into six categories. The top level category of organization is a master file providing information about the maps available to a particular user configuration such as various city and highway maps. An individual road map consists of five separate files. The first map file is a linked list of intersection data with information about the coordinate locations of the roads, the connectivity between intersections, block numbers, road size classification, one-way status, and memory address pointer information that locates the street name. The second map file contains an alphabetically ordered list of all street names, and associates each name with memory address pointers relating back to the appropriate intersection data in the first map file. The third map file provides means for quickly looking up street names by providing 26 pointers into the second map file for the streets with each pointer starting with a letter of the alphabet. For streets having number references, we locate the streets at the beginning of the file so that the reference implies a 27th pointer. The fourth map file contains records with information that relate rectangular patches of the map to the corresponding road data within the first map file to provide rapid access. The fifth map file is an extraction of the first map file containing only intersections of roads that are primary highways allowing this map to be more efficient for display and route selection of large regions.

The master map file contains an entry for each available map and provides the means for switching between maps. Each entry in this file records the textual map name, the file name associated with the map, the geographic reference coordinates of the map, and the North-South/East-West extent of the map. The master map file changes with each new installation of a road map database.

Figure 5:
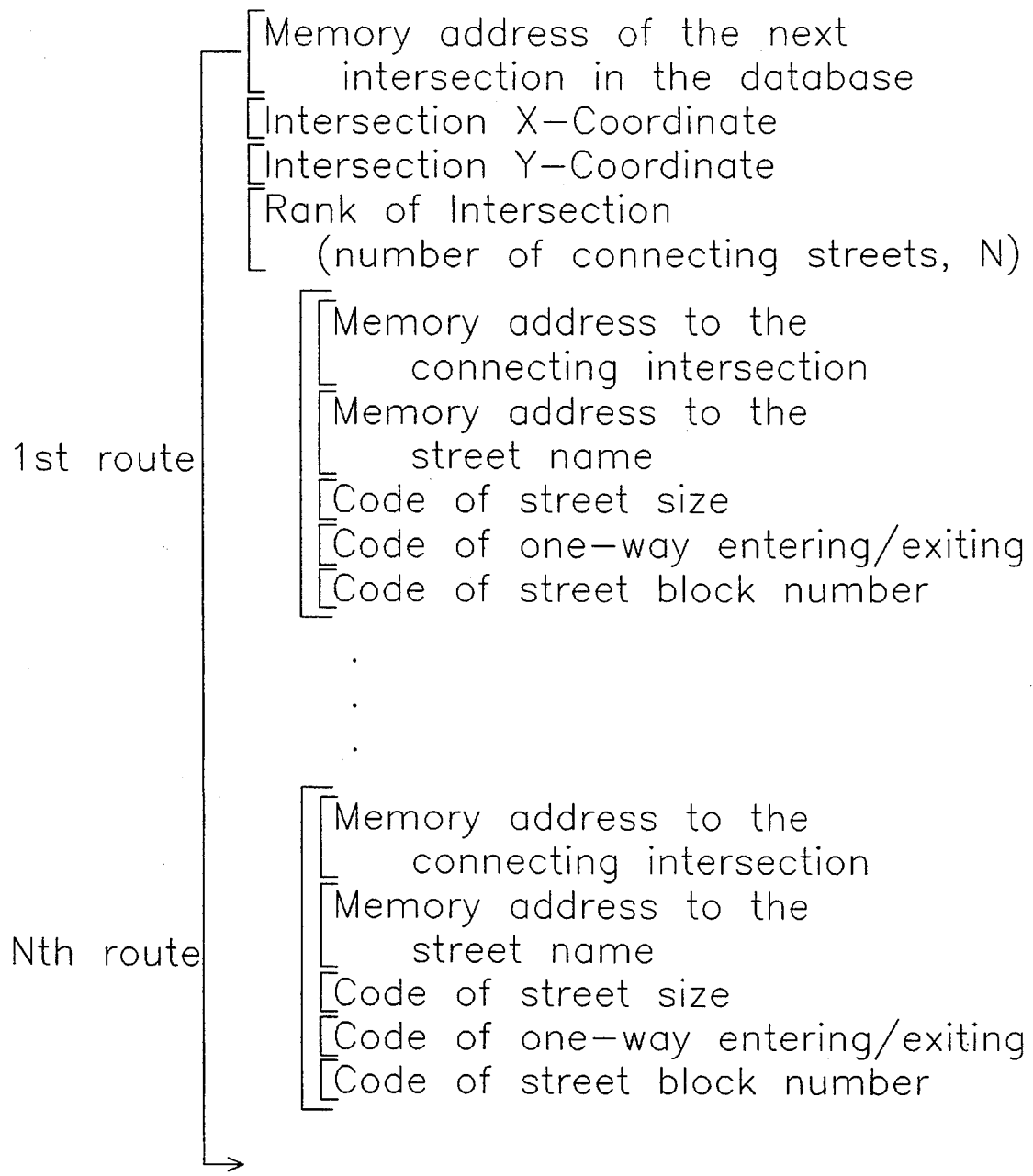
FIG. 5 is the data structure for the road system intersection connectivity database.

The first map file is a linked list indicative of the road system intersection connectivity. The term intersection within the context of this patent application indicates not only the familiar types of road intersections, but also includes roads that come to a dead end, and roads containing significant curves. We define dead end intersections as rank one since there is only one route in or out of the intersection. Intersections of rank two are where there are two routes in or out. We additionally use intersections of rank two to model curved roadways as collections of straight line segments between 2 rank two intersections. FIG. 5 illustrates the data organization of an intersection contained in the road map database. The organization of the intersection data is in geographic patches such that each patch corresponds to a map region. A typical patch for a city covers about one square kilometer.

Figure 6:
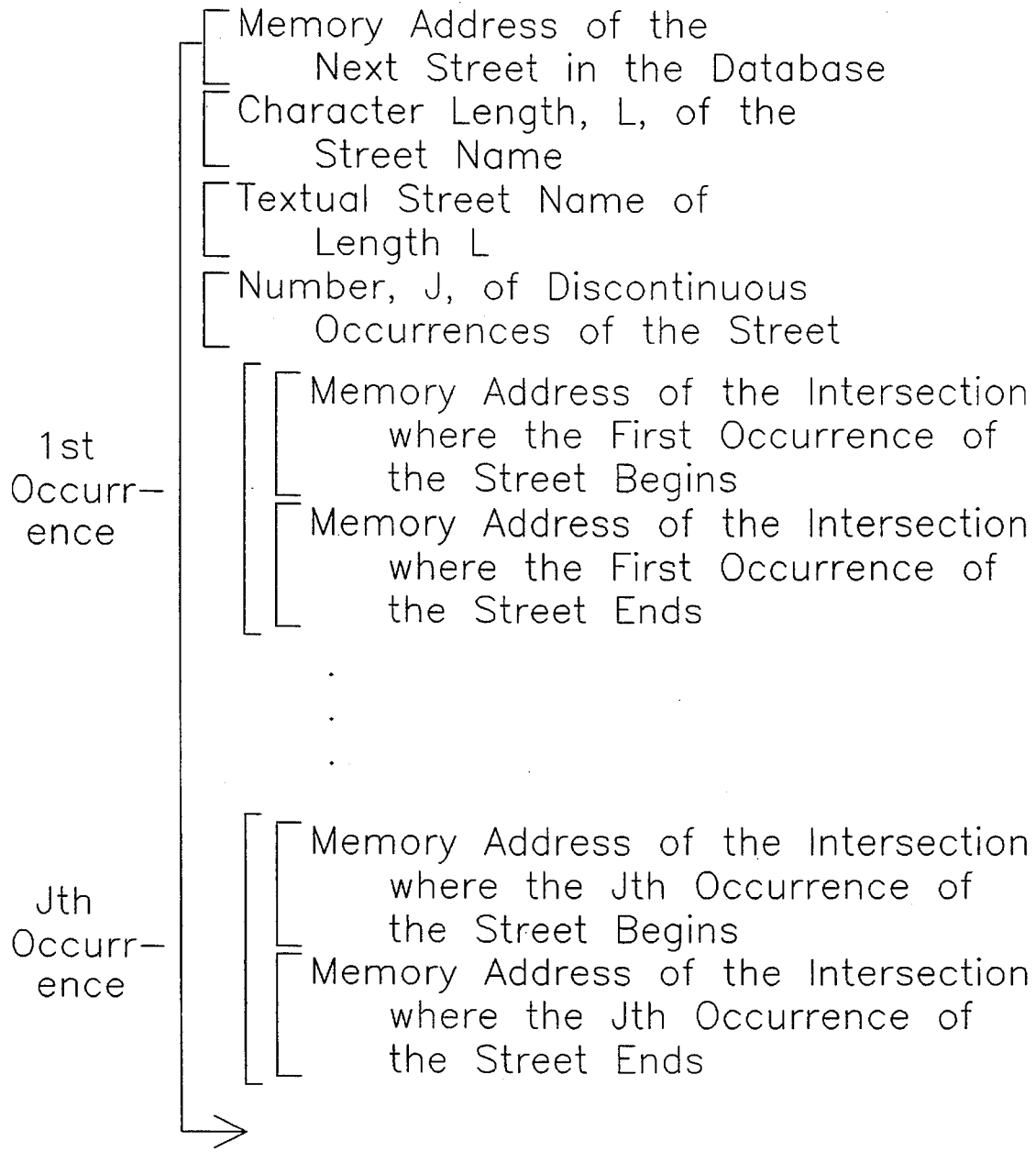
FIG. 6 is the data structure for the street name information.

The second map data file contains street name information with links to the corresponding intersections in the first map data file. For each street name, there is an entry specifying the textual street name, followed by pointers to the two intersections in the first map data file where the street begins and ends. If there are multiple occurrences of the street name or if the street is discontinuous, multiple pairs of intersection pointers provide the beginning and end of each occurrence. FIG. 6 illustrates the data organization for each street name entry in the road map database. This organization of data allows rapid reference from the intersections to the street name and from the street name to intersections comprising the street.

Figure 7:
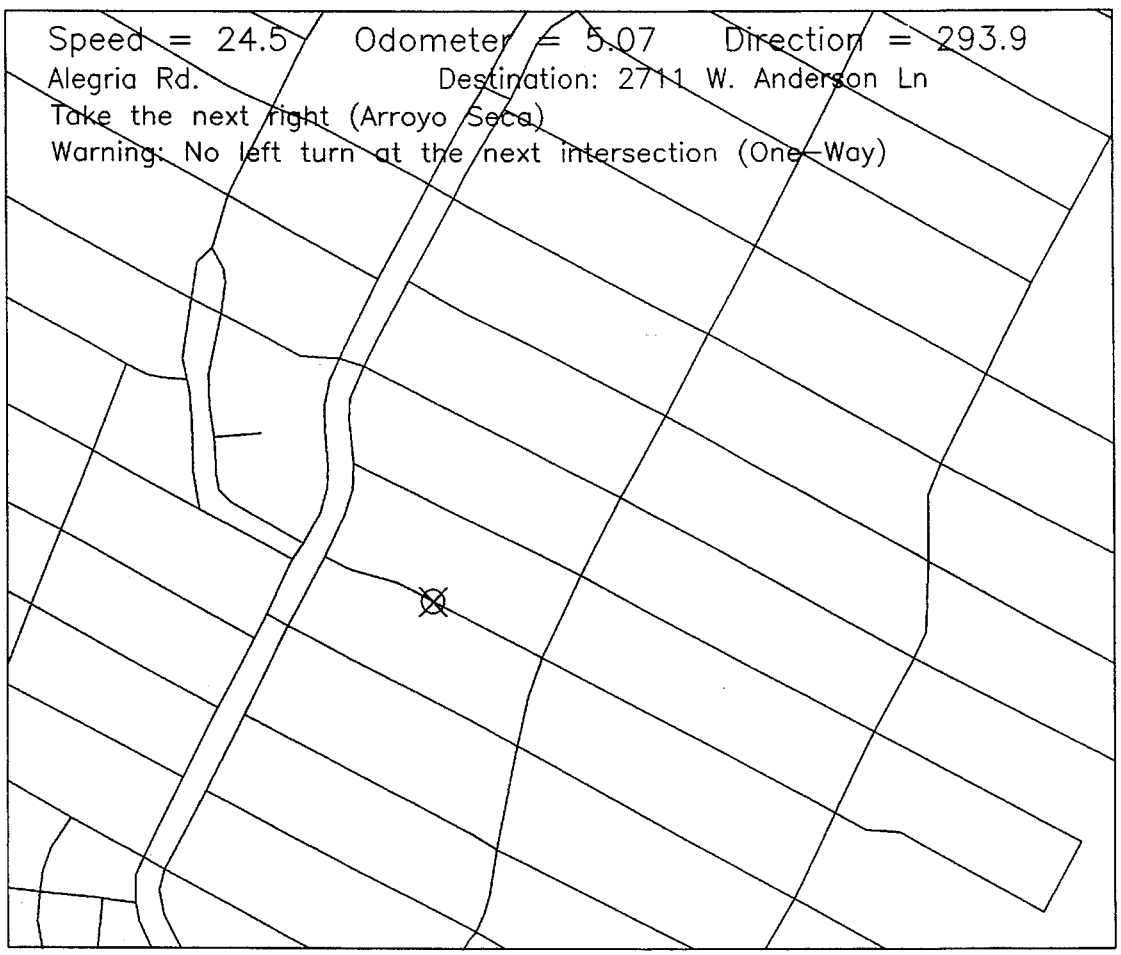
FIG. 7 is a typical display of the invention showing the location of the automobile on the digitized map.

The user display of the vehicle navigation system is an aggregation of numerous bits of information. FIG. 7 is a typical user display of the present invention. The display is a combination of a textual information window and a graphical map window. The textual window displays the vehicle's speed, odometer reading, compass heading, and the driving route if the route is on a roadway in the road map database. The graphical map window displays a presentation of the streets by drawing lines between linked intersections in the map database. Each line can have a separate color, thickness, or pattern to indicate the road size classification. The graphical map window also can display any arbitrarily set location within the map region. As the displayed region becomes larger, the navigation system ignores roads of smaller size in drawing the map display to eliminate excessive clutter. When the displayed region becomes too large, the display switches to the fifth map database file containing intersections of only primary roads. As the system tracks the route of the vehicle, the system automatically adjusts the graphical display window to keep the vehicle's location centered.

Figure 8A:
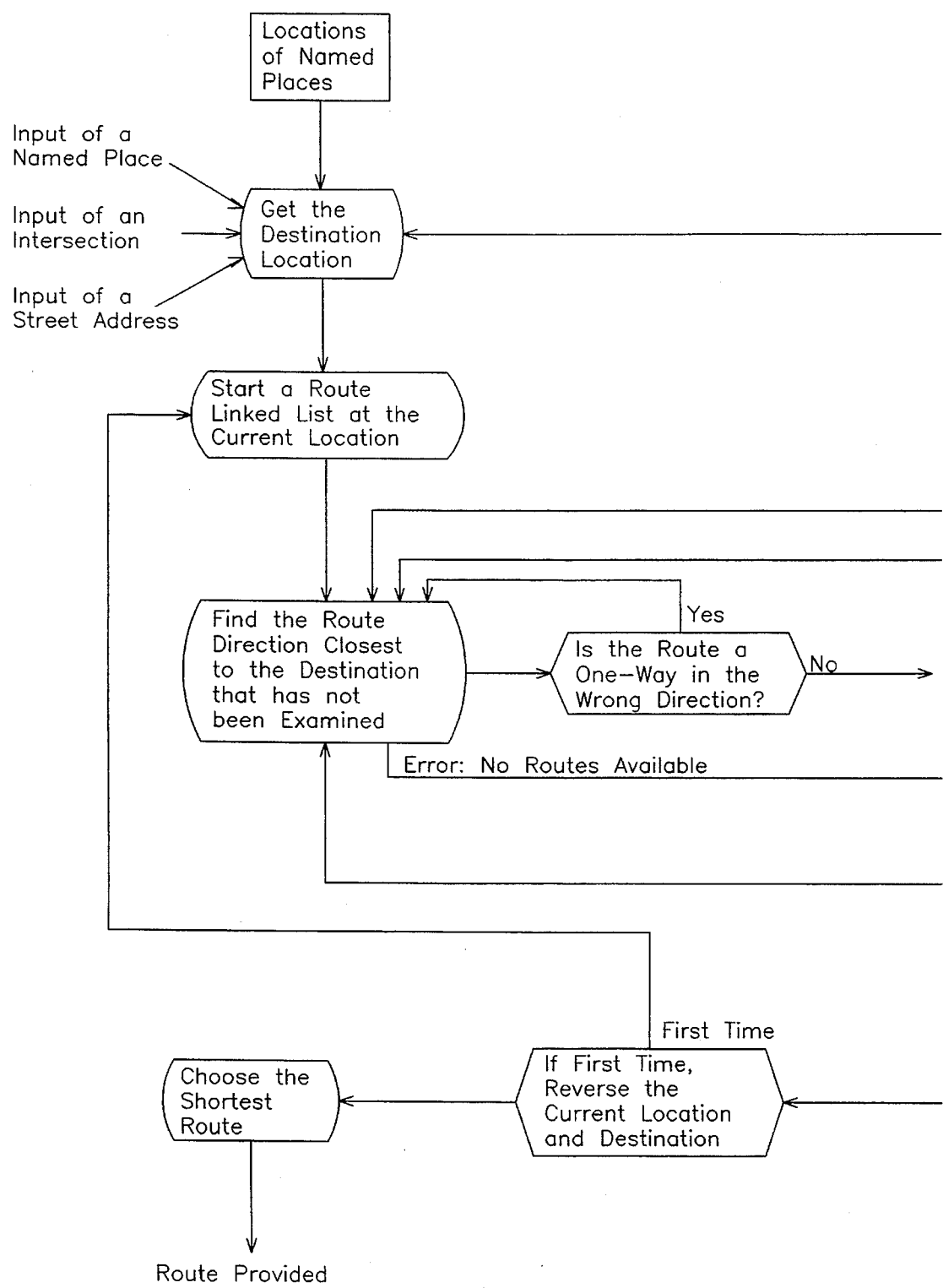
FIG. 8 is a flowchart of determining the optimum route between the starting location and the destination location.
Figure 8B:
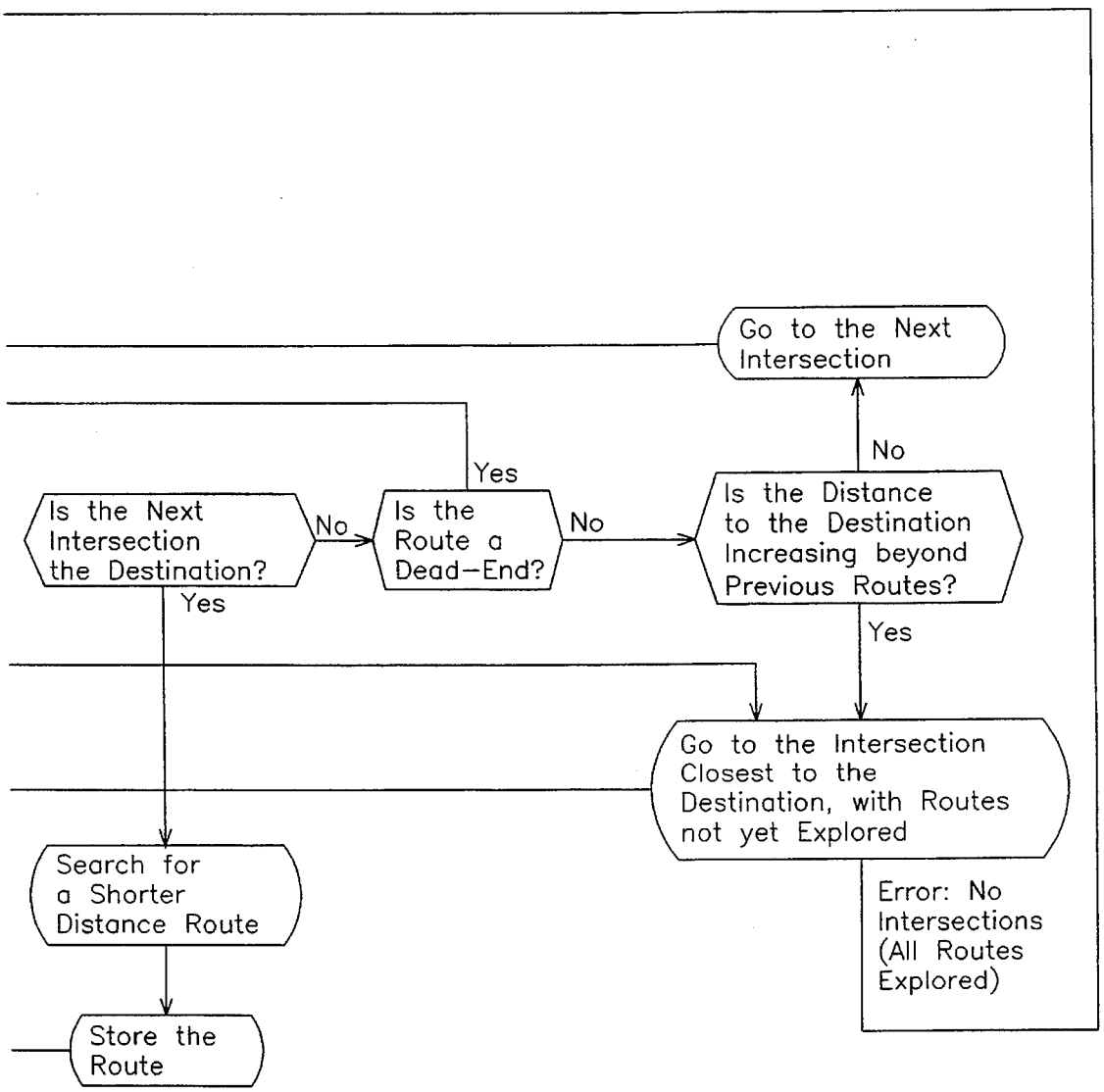

Determining the destination location by the navigation system begins when the driver inputs the destination address. FIG. 8 illustrates the route selection process for the navigation system. Entry of the destination address can be as a street and block number, as the intersection of two streets, or selected from categories of named locations. The system develops the route between the current location and the input destination location in the form of a linked list similar to the road map intersection data base. Starting with the current location, the system proceeds in the direction closest to the direction of the destination. When reaching an intersection, the system chooses the route closest to the direction to the destination. Successive application of this process continues until the system reaches one of three conditions: (1) the route reaches the destination, (2) the distance to the destination location begins to increase, or (3) the route reaches a dead end. If the distance begins to increase, the system explores routes with the second best direction to the destination. When the system exhausts all possibilities, then there is no direct connecting route in the road map database between the current location and the destination and the navigation system produces an error result. If a route connects the current location and the destination, the system explores alternative routes by taking alternative paths from each intersection along the way. When the system locates an apparently optimum mute, the system stores this path and the route selection process begins again but this time starting from the destination and backtracking to the current location. Quite frequently, these two independently established routes will differ. When this condition occurs, the system compares the two routes to determine which route is the most optimum and establishes that route as the best one to use. The system optimizes the travel route for either distance or travel time. If optimizing the route for travel time, the system divides the distance by an appropriate estimate of the speed appropriate for the roadway size designation along the travel route and uses this quantity representing time for optimizing rather than the distance.

Figure 9:
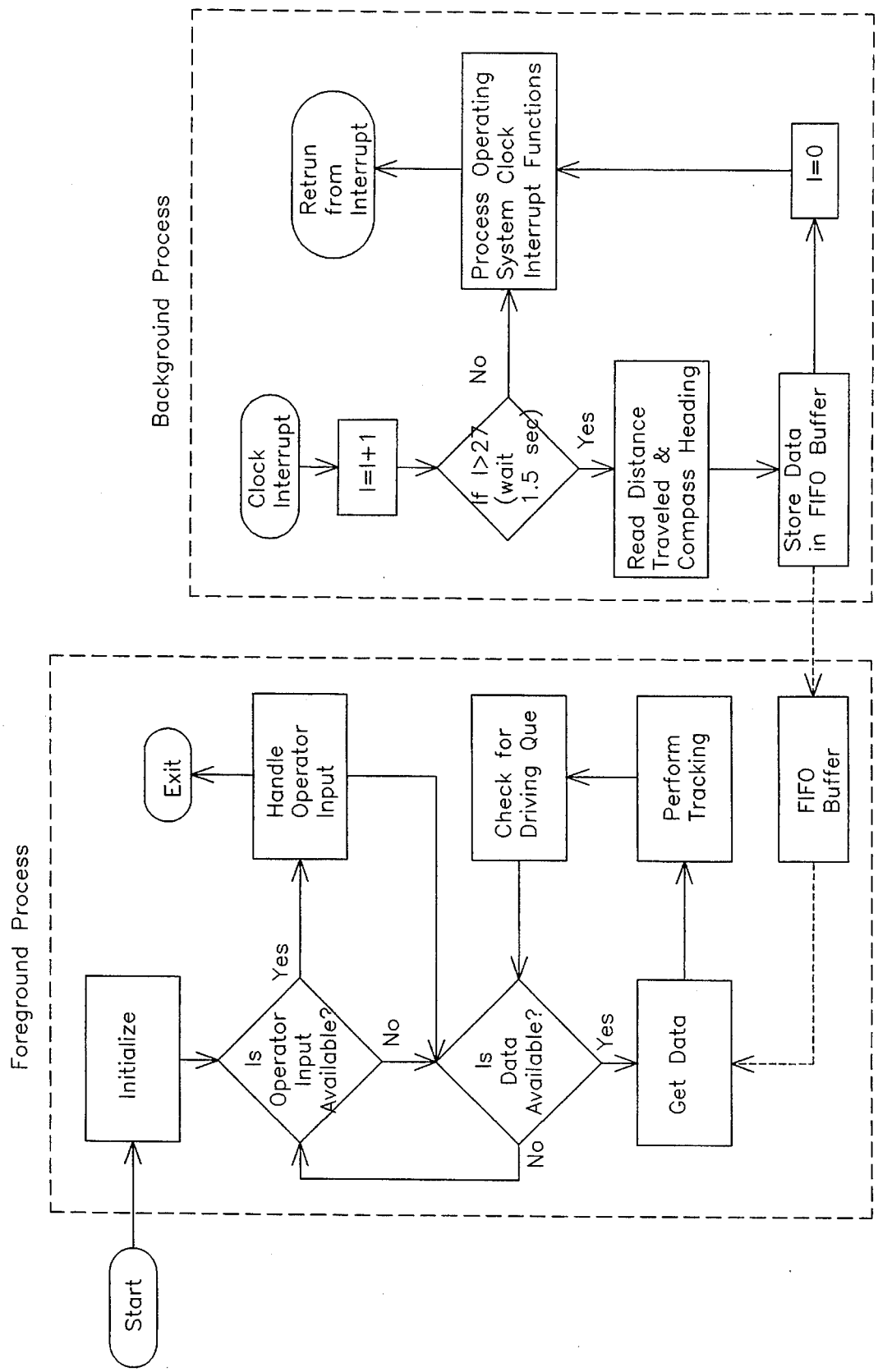
FIG. 9 is a flowchart of the overall software component of the invention.
Figure 10A:
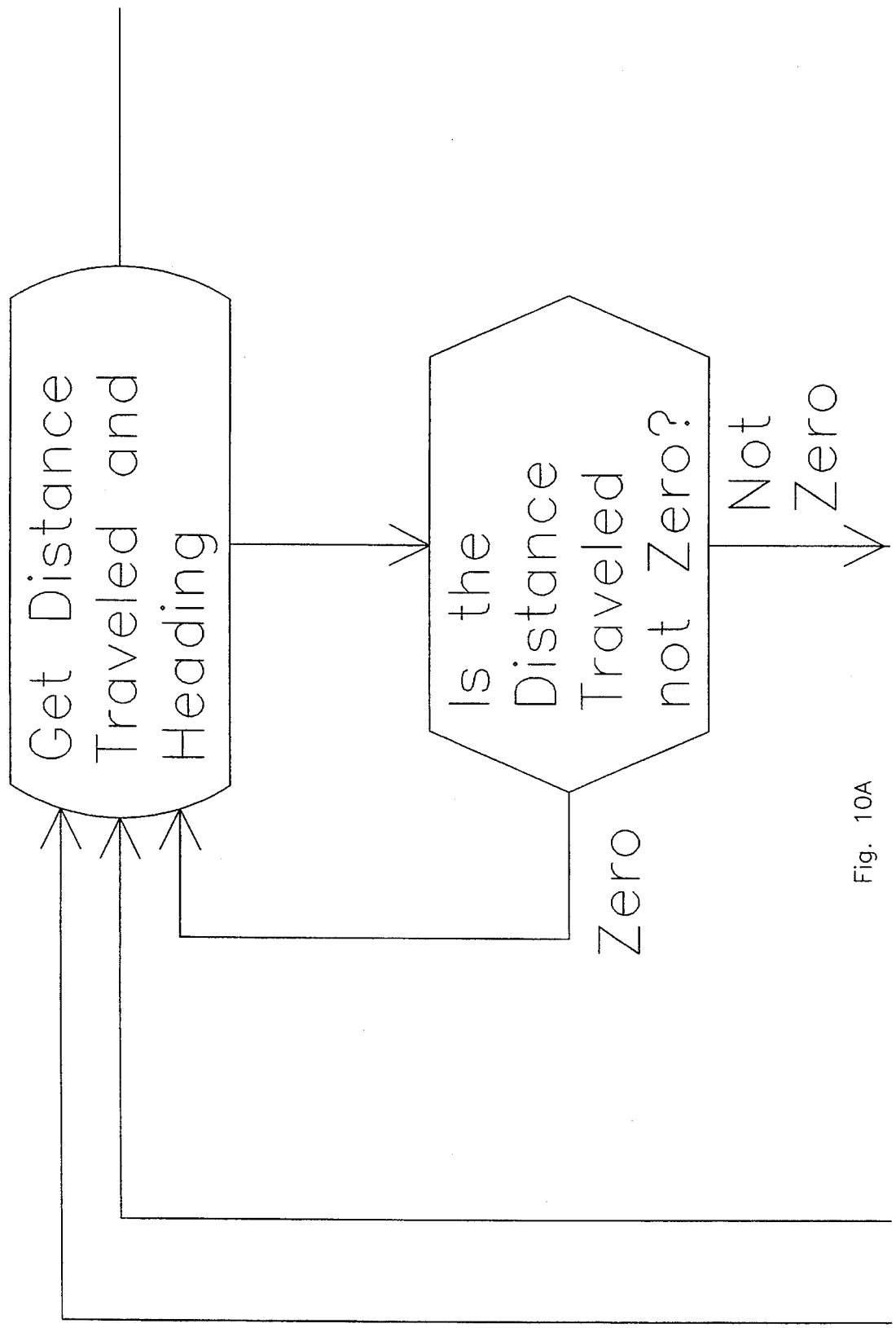
FIG. 10 is a flowchart of determining the next roadway projected coordinates to use by calculating the most probable navigation route taken.
Figure 10B:
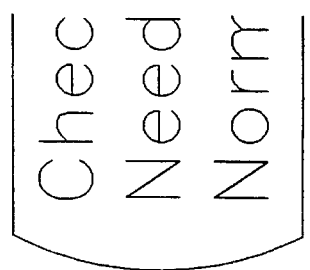
Figure 10D:
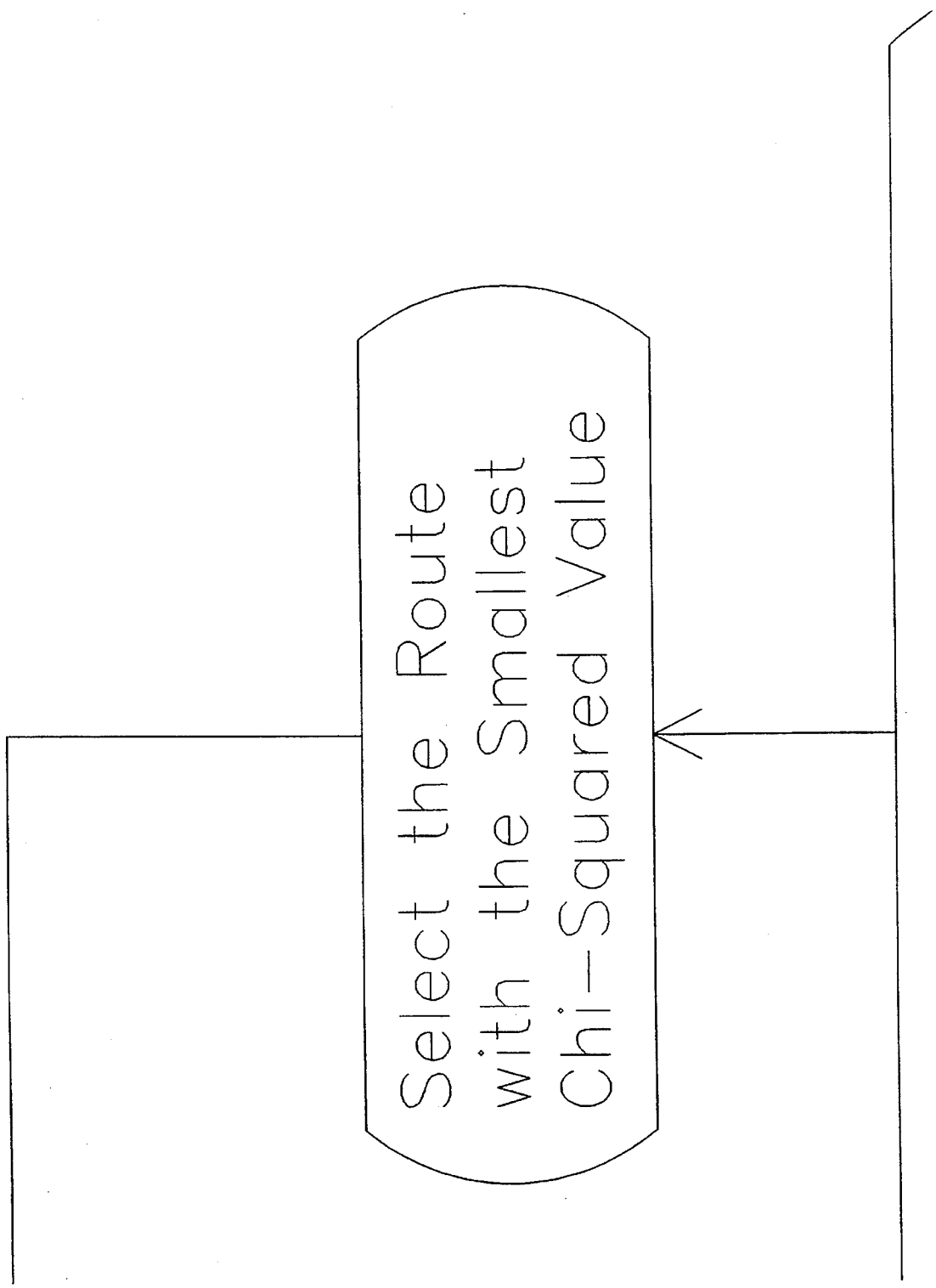
Figure 10F:
Figure 10I:
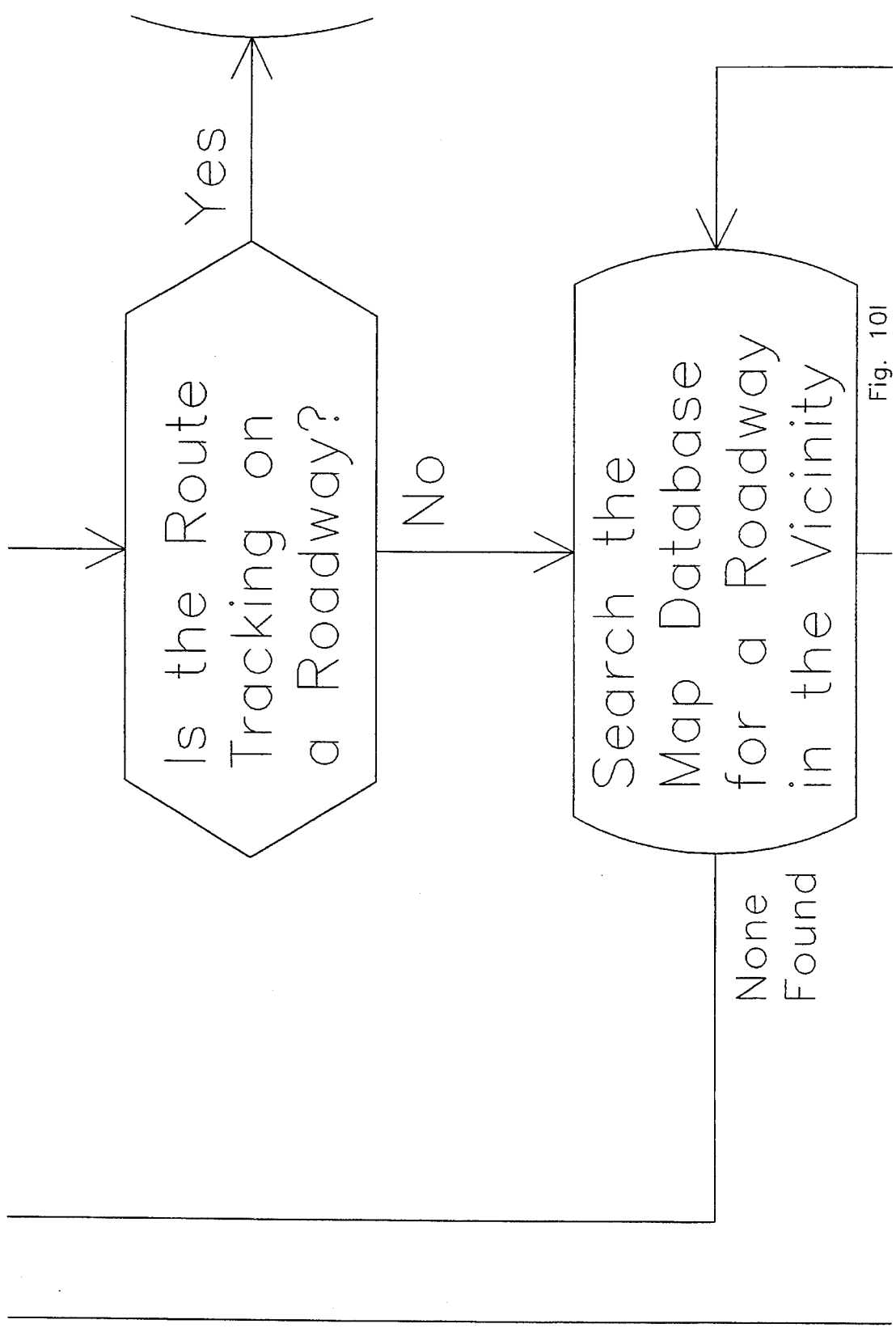
Figure 10J:
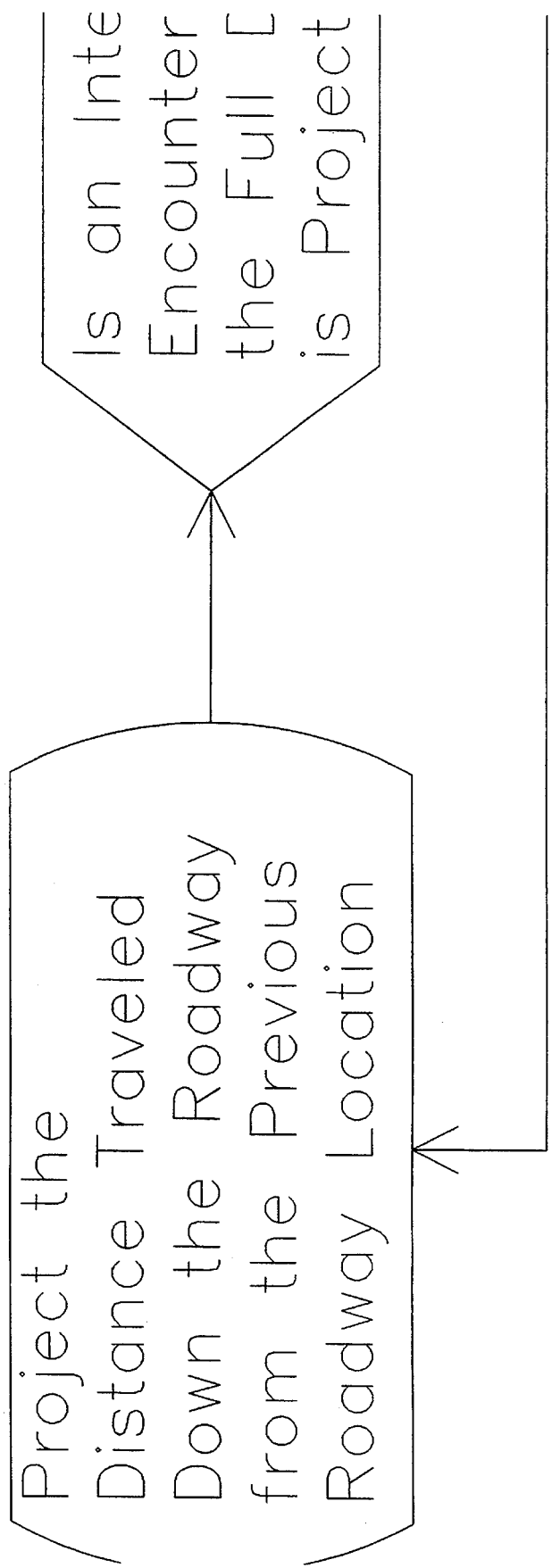
Figure 10K:
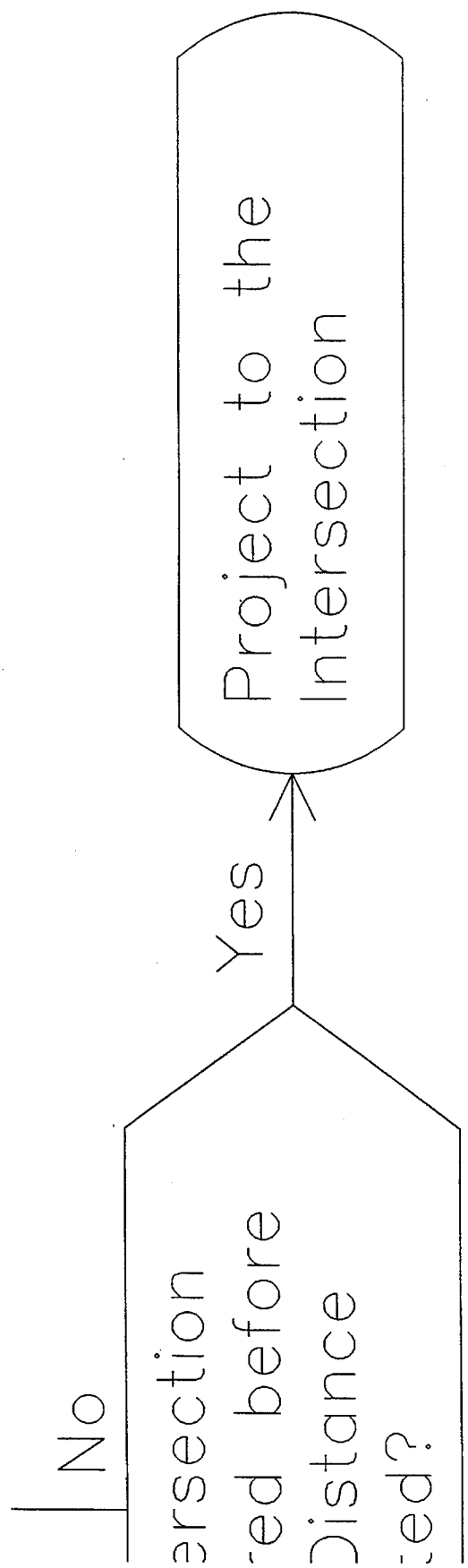
Figure 10L:
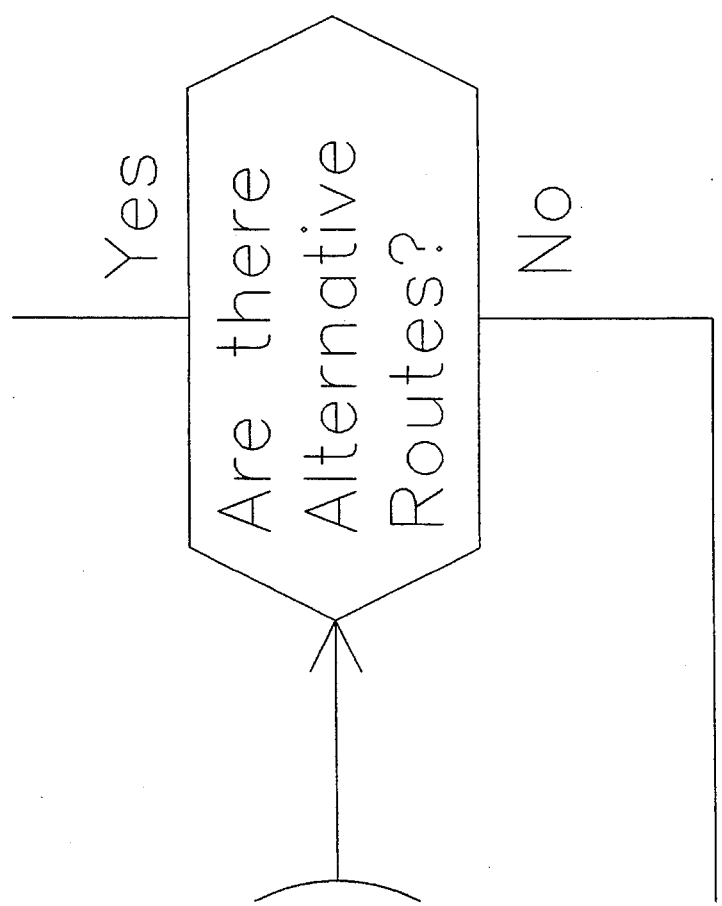
Figure 10M:
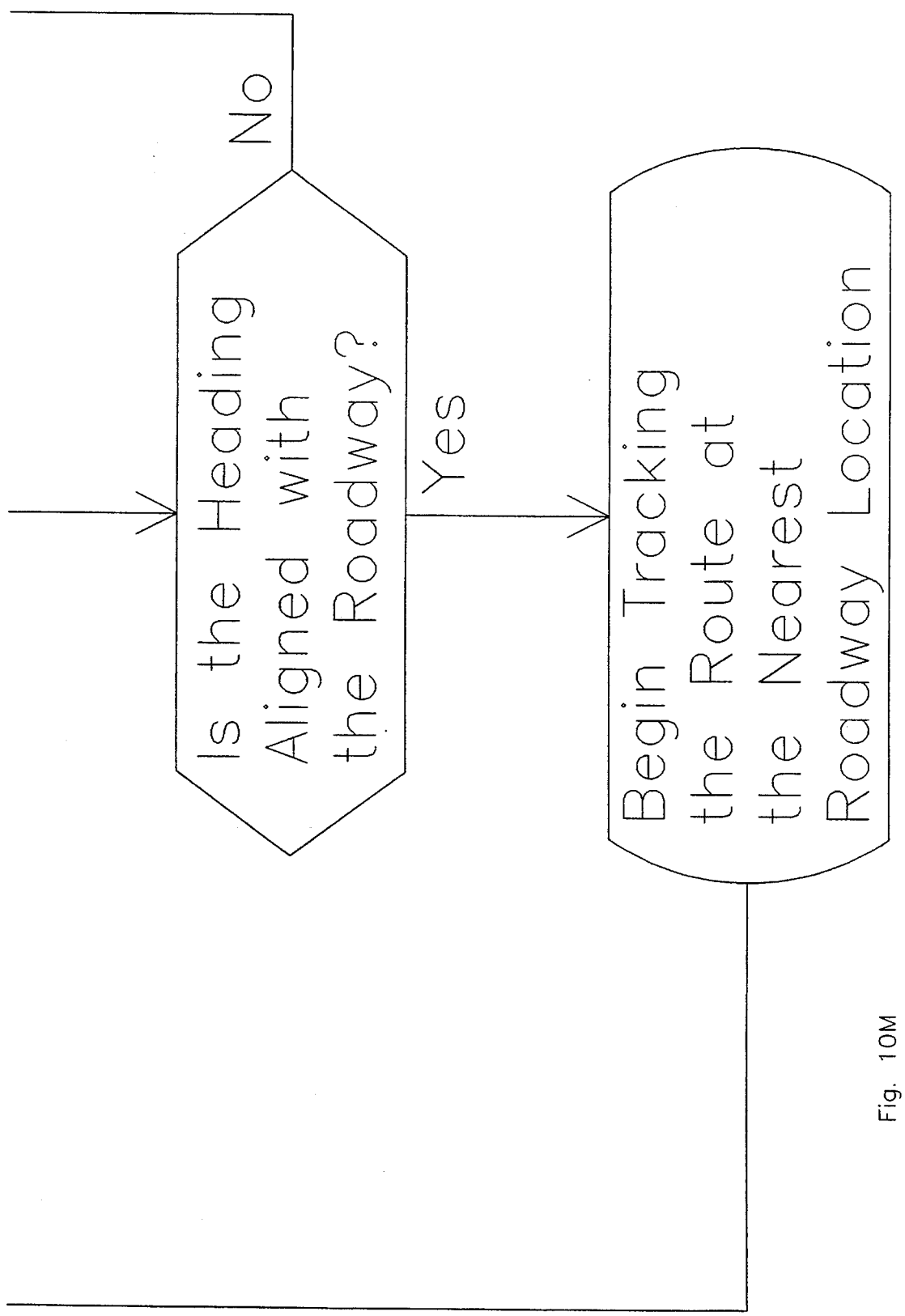

The software for the navigation system has two independent components. Referring now to FIG. 9, the foreground component begins at the start indication and executes the tracking process plus any interaction with the operator. The initialization of the tracking process includes getting the current location, the destination location, determining the initial dead-reckoned coordinates, and determining the initial road way coordinates. The foreground thread of execution operates in a polling loop checking first for operator input and then for availability of distance traveled and compass heading data. The background thread of execution operates as an interrupt routine triggered by the system clock and acquires the raw data for the distance traveled and compass heading. The background interrupt routine executes at a higher priority than the foreground program and simply counts system clock interrupts until a prescribed, fixed time elapses at which point the background process reads the distance traveled counter and compass heading data. The background interrupt routine then places the data into a FIFO buffer where the data is available to the foreground process upon return from the background interrupt process. The advantage of this scheme is that the data collection process proceeds reliably on a cyclic basis while leaving the foreground process to concentrate on tracking the vehicle and the determining the navigation route.

Tracking in the navigation system is a three part process of (1) determining the dead reckoning location, (2) determining the roadway projected location from the road map database by calculating the best navigation route taken by the vehicle according to the current dead-reckoned coordinates, and (3) normalizing the dead reckoning location to the roadway projected location. FIG. 10 illustrates the process of determining the dead reckoning location and the roadway location. Beginning at a starting location, the system calculates the dead-reckoning location using the compass heading and distance traveled data. We model the dead-reckoning path by assuming that a circular arc best approximates any turning motion of the vehicle by using not only the known information of $x_{i-1}, y_{i-1}$; but also, $\theta_{i-1}$. The counting index, i, increases as time progresses.

Figure 11:
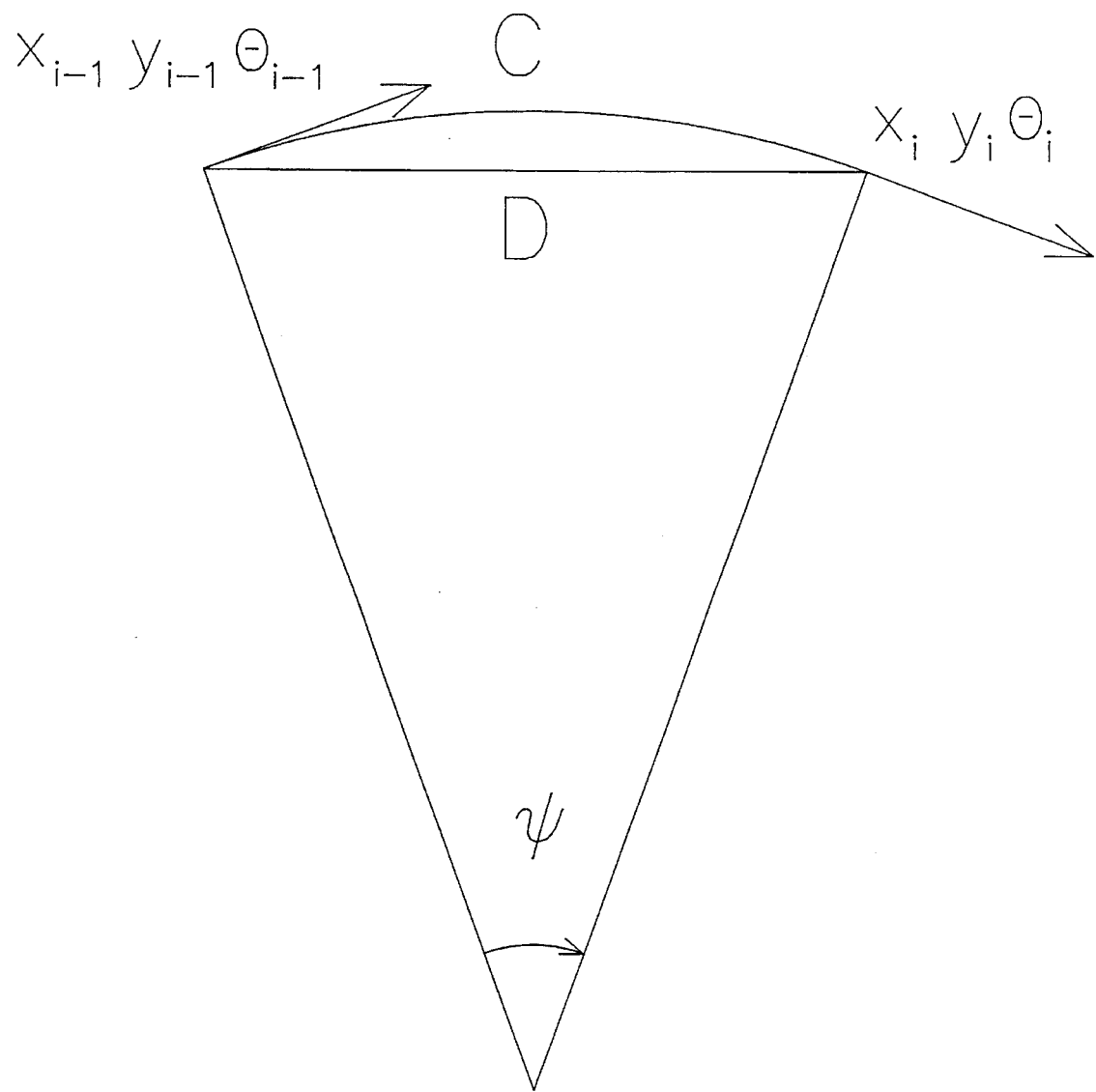
FIG. 11 shows the dead-reckoning modeling geometry used in the invention.

We calculate the dead-reckoning location using the following equations:

$$\psi = MOD(\theta_i - \theta_{i-1}, 180°) \quad (1)$$

$$D = 2 \cdot \left( \frac{C_i}{\psi} \right) \cdot \sin\left( \frac{\psi}{2} \right)$$

$$x_i = x_{i-1} + D \cdot \cos\left( 90° - \left( \theta_{i-1} + \frac{\psi}{2} \right) \right)$$

$$y_i = y_{i-1} + D \cdot \sin\left( 90° - \left( \theta_{i-1} + \frac{\psi}{2} \right) \right)$$

where C is the distance traveled converted to appropriate units of distance, D is the effective distance traveled (the straight line approximation of C), and θ is the vehicle compass heading measured in degrees. FIG. 11 illustrates the geometric relationship of the parameters used in calculating the dead-reckoning location. The MOD function is a modulus function that compensates for the heading being defined only from zero to 360 degrees. The location coordinates x and y are aligned so that the x-axis points to the east and the y-axis points north. Prior modeling of the dead-reckoning location by other navigation algorithms did not consider the term $\theta_{i-1}$. Ignoring $\theta_{i-1}$ leads to the equivalence of C and D in other systems. Referring back to FIG. 10, if the dead-reckoned coordinates and compass heading are sufficiently close to a roadway projected coordinate within the road map database, the system will adopt the roadway location and heading as the initial roadway location.

As the vehicle moves, the present invention records the dead-reckoned coordinates and the roadway projected coordinates in a location heading FIFO buffer of appropriate length, n, preferably about fifteen, which corresponds to about 22 seconds of driving time. Data enters this buffer only when the distance traveled is non-zero. When the roadway projected coordinates pass through an intersection, the system calculates a sum-of-squares function for all route alternates to evaluate the most probable route driven. The theory and use of least-squares is a widely used technique in data analysis to compare measured data to numerically predictable values for these measurements and is best described by Bevington, Philip R., *Data Reduction and Error Analysis for the Physical Sciences*, p. 188, MCGRAW-HILL (1969). The route with the smallest value from the sum-of-squares calculation is the most probable route driven. The system calculates the most probable route driven according to the following equation:

$$\chi^2 = \sum_{i=1}^{n} \left[ \frac{(x_i - x_i')^2}{\sigma_x^2} + \frac{(y_i - y_i')^2}{\sigma_y^2} + \frac{(\theta_i - \theta_i')^2}{\sigma_\theta^2} \right] \quad (2)$$

where $(x_i, y_i)$ are dead-reckoned coordinates of the $i^{th}$ measurement, $(x_i', y_i')$ are the roadway projected coordinates of the $i^{th}$ measurement, $\theta_i$ is the heading from the $i^{th}$ measurement, $\theta_i'$ is the heading of the roadway at the location $(x_i', y_i')$, $\sigma_x$ and $\sigma_y$ are the statistical standard deviations or the uncertainties of the dead-reckoned coordinate measurements, and $\sigma_\theta$ is similarly the uncertainty of measuring the compass heading. This summation extends over the length n, of data in the location-heading FIFO buffer. Regarding the counting index in this buffer, increasing i values extend back in time with the most recent data set corresponding to i=1.

The route with the minimum value from the sum-of-squares function is the route chosen to project the roadway coordinates to the next location. If there are multiple routes with similarly small sum-of-square values, the system compares the multiple routes for each new set of heading and distance traveled data until one route clearly is the most probable route. If the sum-of-squares value becomes large with no matching route found, the system assumes that the vehicle is traveling "off-road" and will only perform dead-reckoning calculations without the corresponding road way calculations. "Off-road" conditions occur, for example, if the vehicle enters a parking lot or a private driveway. In the "off-road" situation, the system periodically searches the road map database for roadway projected coordinates matching the dead-reckoned coordinates until the vehicle is again tracking on a road.

Figure 12A:
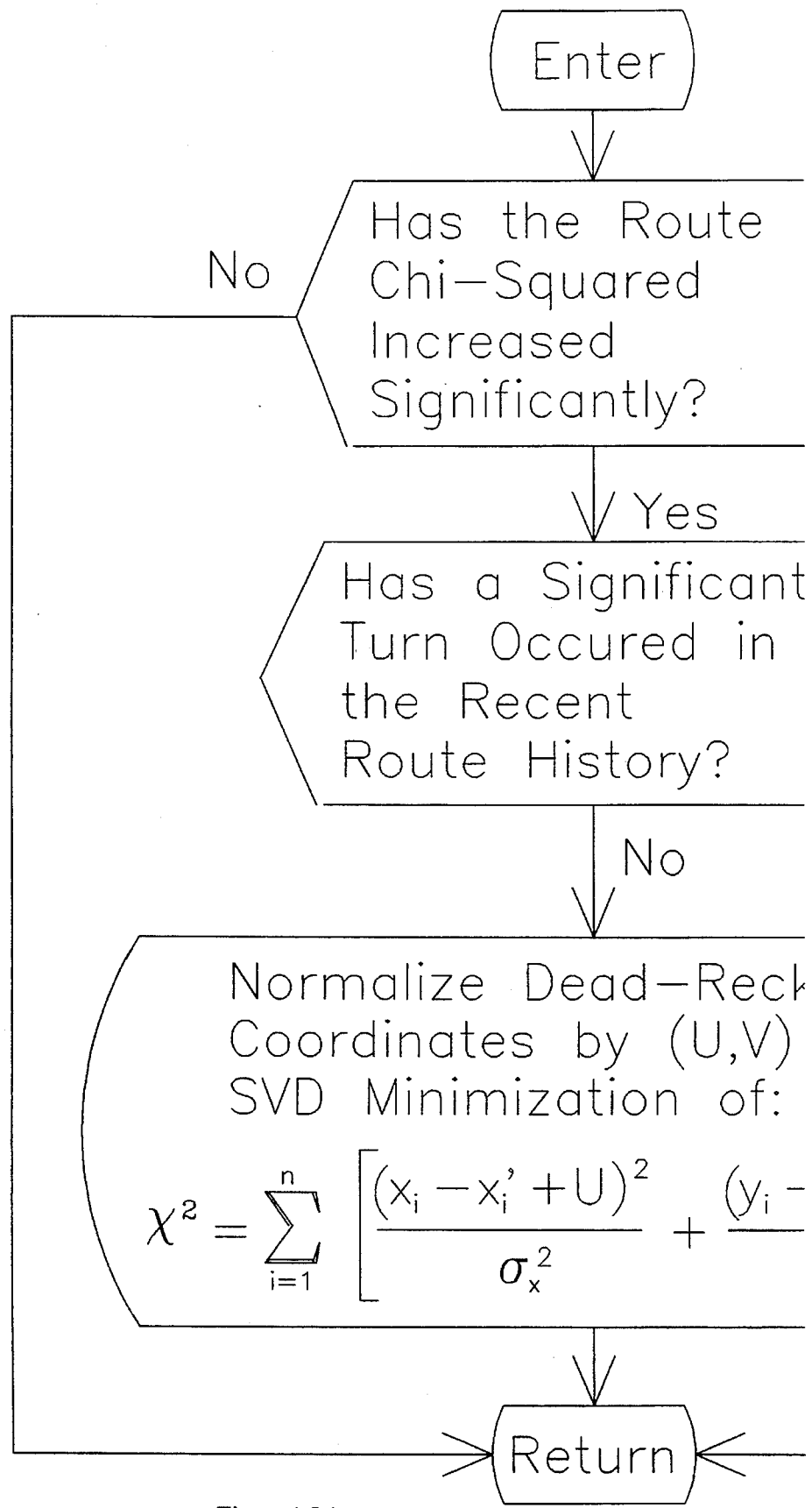
FIG. 12 is a flowchart of the normalization process between the dead-reckoned coordinates and the roadway projected coordinates.
Figure 12B:
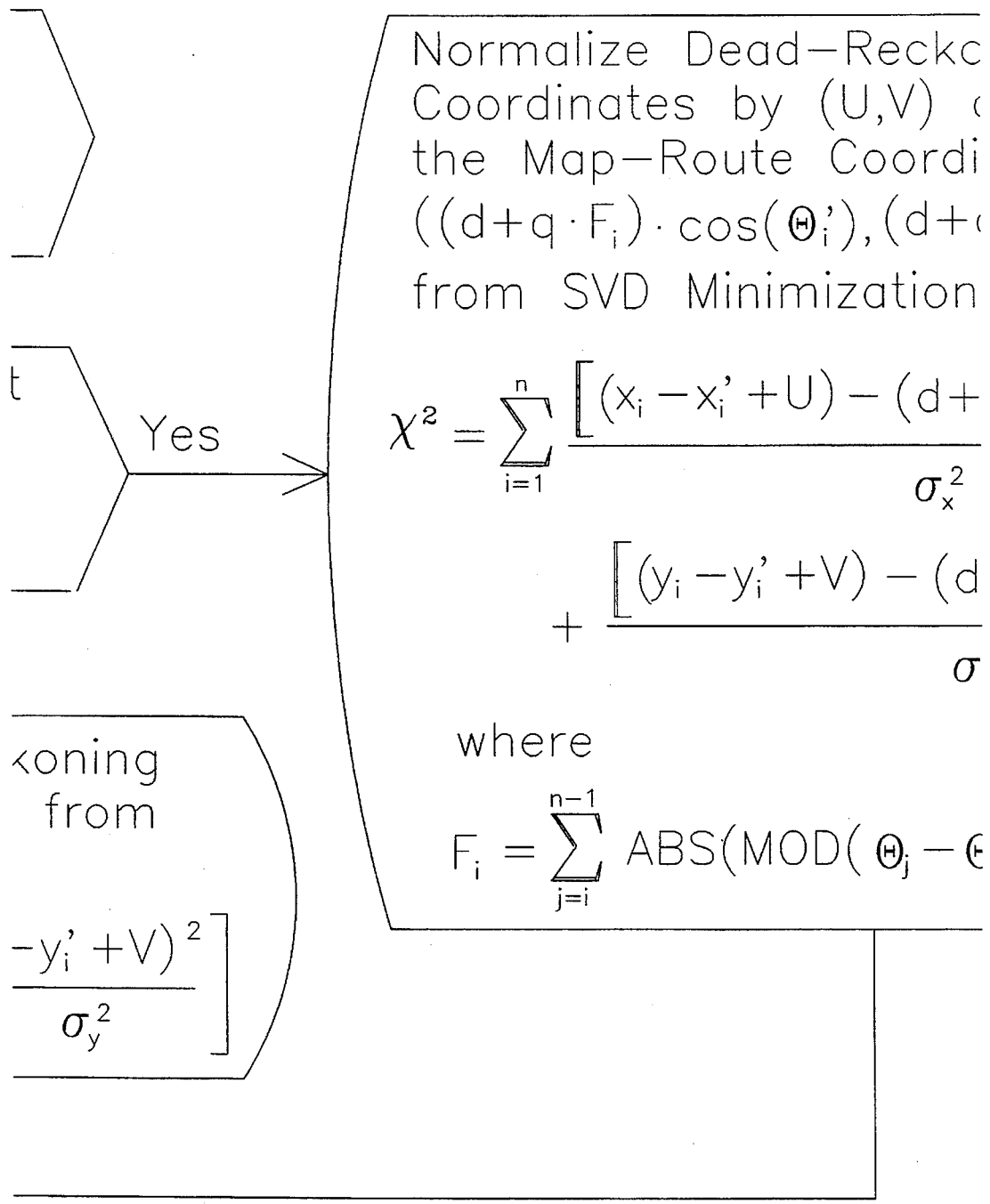

The last part of the tracking process, as illustrated in FIG. 12, is normalizing the dead-reckoned coordinates or location to the roadway projected coordinates or location. The system accomplishes the normalizing process by a minimization process using a sum-of-squares function defined as the difference between the dead-reckoned coordinates and the roadway projected coordinates calculated for all data in the location-heading FIFO buffer. If no significant turn in the roadway exists, or in other words, we are on a straight path, we can apply a simple displacement to the dead-reckoned coordinates to achieve an optimum match to the roadway projected coordinates by using a sum-of-squares minimization with the following equation:

$$\chi^2 = \sum_{i=1}^{n} \left[ \frac{(x_i - x_i' + U)^2}{\sigma_x^2} + \frac{(y_i - y_i' + V)^2}{\sigma_y^2} \right] \quad (3)$$

where U and V are the optimized coordinate adjustment offsets.

Figure 13A:
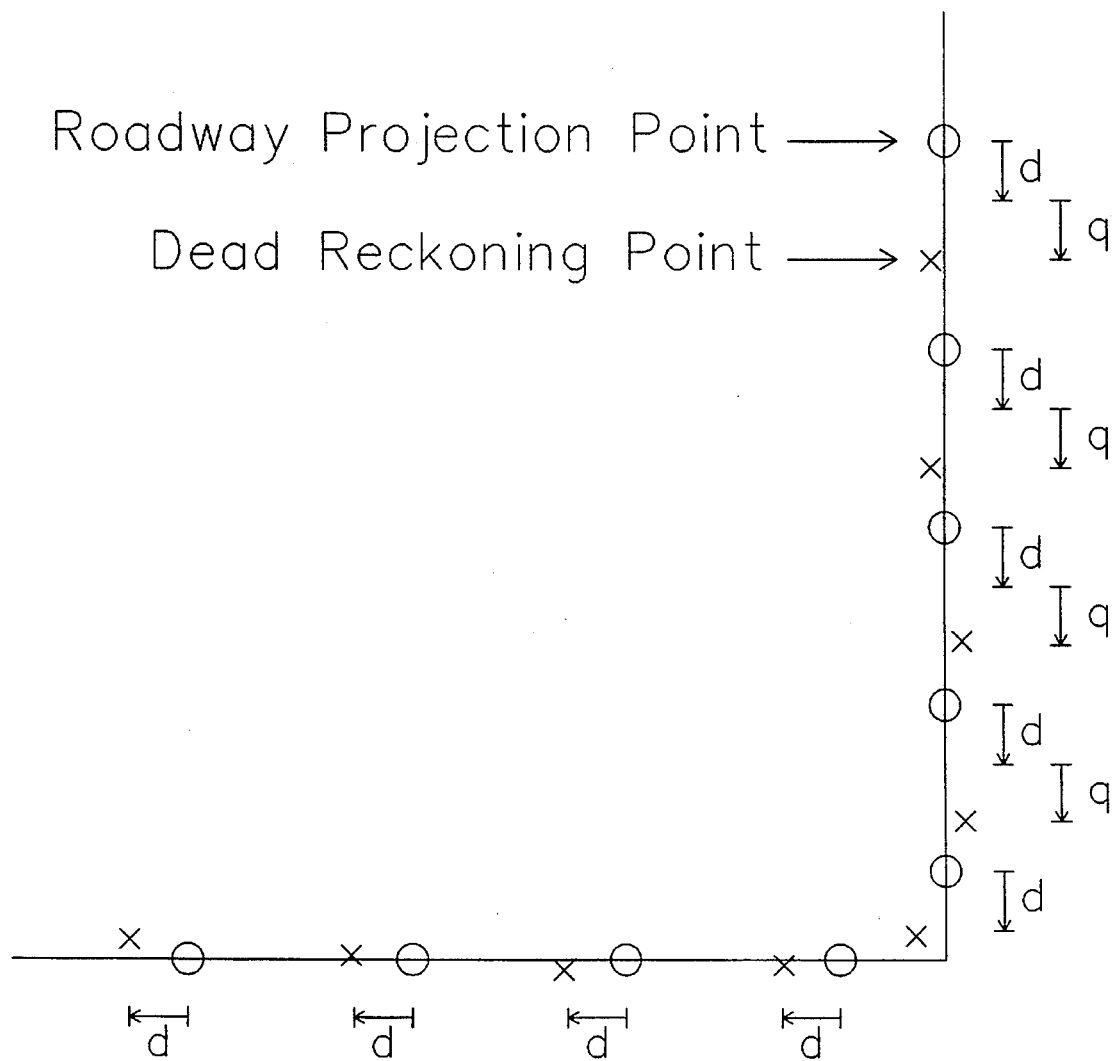
FIGS. 13A & 13B show the effects of the normalization algorithm on the adjustment parameters.
Figure 13B:
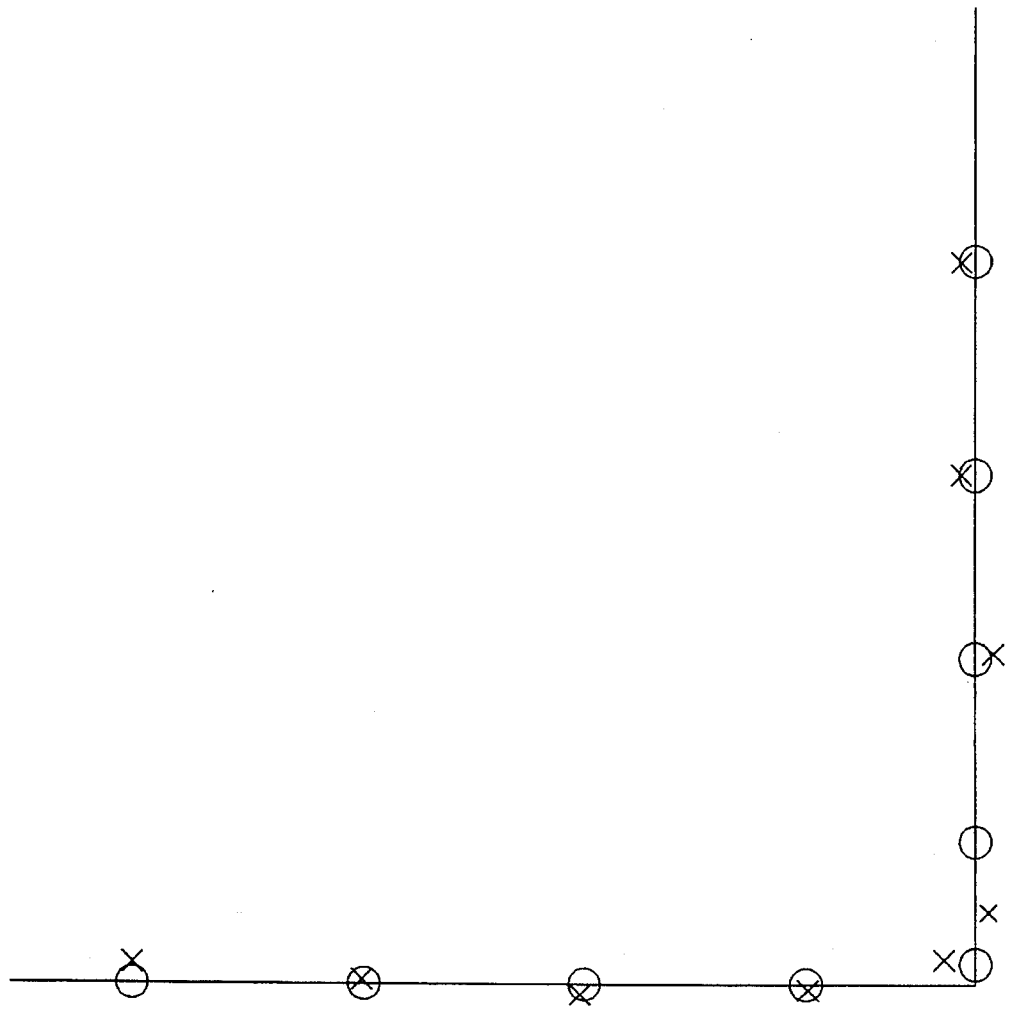

If there is significant turning in the roadway such as a curved road, we displace the dead-reckoned coordinates as with the straight road case but we additionally adjust the dead-reckoned coordinates by first sliding the full set of coordinates along the roadway, and second, by adding an arbitrary path adjustment proportional to the magnitude of the vehicle's turning measured between each successive data point. Other patents known in the art do not correct for the curved path situation. In this invention, however, we normalize the dead-reckoned coordinates to the roadway projected coordinates for curved paths using the following sum-of-squares function:

$$\chi^2 = \sum_{i=1}^{n} \frac{[(x_i - x_i' + U) - (d + q \cdot F_i)\cos(\theta_i')]^2}{\sigma_x^2} + \quad (4)$$

$$\frac{[(y_i - y_i' + V) - (d + q \cdot F_i)\sin(\theta_i')]^2}{\sigma_y^2}$$

where d and q are the arbitrary adjustment factors, and where the following function defines $F_i$:

$$F_i = \sum_{j=i}^{n-1} ABS(MOD(\theta_j - \theta_{j+1}, 180°)) \quad (5)$$

where MOD is the same modulus function described previously in equation (1) and ABS is simply the absolute value. Referring to FIG. 13A and 13B, parameter d allows adjustment of all roadway-projected coordinates equally along the roadway, regardless of turning, by allowing the roadway-projected coordinates to slip along the roadway until the roadway-projected coordinates match up with the dead-reckoned coordinates. Parameter q allows for the adjustment of the roadway-projected coordinates according to the amount of turning which is important in considering whether the vehicle rounded a corner either long or short. An additional advantage to using this method is that the normalization also accounts for the width of the roadway as the vehicle travels on the roadway.

The preferred sum-of-squares minimization algorithm applied to Eqs. 3 and 4 is the method of Singular Value Decomposition (SVD) as discussed in Press, William H., Flannery, Brian P., Teukolsky, Saul A., and Vetterling, William T., Numerical Recipes, *The Art of Scientific Computing*, Chapter 2, Section 9, CAMBRIDGE PRESS (1989), and incorporated by reference herein. SVD greatly simplifies the calculations involved in a vehicle navigation system because the path adjustment function is linear in the adjustment parameters. Additionally, SVD does not use an arbitrary rotational adjustment because (1) rotation is a non-linear transformation except in the limit of small angles, and (2) the accuracy of the digital compass does not warrant the use of an arbitrary adjustment. SVD has several other advantages over the prior art determinate methods including: (1) other determinate methods require a separate derivation for each possible sequence of intersections, (2) SVD requires only first derivatives at the coordinate locations making the calculations both easier to perform and independent of any combination of intersections, and (3) SVD is benign at parameter singularities, points where determinate methods fail. One easily overcome limitation to using SVD is that the $\chi_2$ value may be discontinuous when displacing a roadway projected coordinate through an intersection. This form of discontinuity results in SVD providing a less than optimum prediction of parameter adjustment, although in these situations, iterations of SVD improve convergence.

An important requirement for recording business usage of vehicles is to record the mileage driven for business purposes. Many businesses also would agree that the ability to record the driven route, the mileage, location of stops, duration of stops, and the total duration of the travel is very desirable. With this in mind, the present invention records the above information into a historical data file. This historical information also includes a pointer to the intersection in the map database, the intersection coordinates, the time that the vehicle passed through the intersection, and stops of a significantly long duration. To prevent an employee from tampering with the operation of the navigation system, we can further modify the system software to password protect access to the system.

Other embodiments of the invention will be apparent to those skilled in the art after considering this specification or practicing the disclosed invention. The specification and examples above are exemplary only, with the true scope of the invention being indicated by the following claims.

I claim the following invention:

1. An apparatus for vehicle navigation and driving assistance, comprising:
   a computer;
   a road map database stored in said computer;
   means for acquiring a vehicle's distance traveled and compass heading;
   means for calculating dead-reckoned coordinates from said vehicle's distance traveled and compass heading;
   means for acquiring roadway projected coordinates from said road map database;
   means for determining a probable navigation route for acquiring the next roadway projected coordinates from said map database;
   means for normalizing said dead-reckoned coordinates to said roadway projected coordinates; and
   means for displaying said normalized coordinates on a visual representation of a portion of said road map database to assist the user in determining said vehicle's current location.

2. The apparatus of claim 1 wherein said means for determining said probable navigation route uses a sum-of-squares minimization according to the following equation:

$$\chi^2 = \sum_{i=1}^{n} \left[ \frac{(x_i - x_i')^2}{\sigma_x^2} + \frac{(y_i - y_i')^2}{\sigma_y^2} + \frac{(\theta_i - \theta_i')^2}{\sigma_\theta^2} \right]$$

where
   $(x_i, y_i)$ are the dead-reckoned coordinates of the $i^{th}$ measurement,
   $(x_i', y_i')$ are the roadway projected coordinates of the $i^{th}$ measurement,
   $\theta_i$ is the heading from the $i^{th}$ measurement,
   $\theta_i'$ is the heading of the roadway at the location $(x_i', y_i')$,
   $\sigma_x$ and $\sigma_y$ are the statistical standard deviations of the dead-reckoned coordinate measurements, and
   $\sigma_\theta$ is statistical standard deviation measuring the compass heading.

3. The apparatus of claim 2 where said means for calculating said dead-reckoned coordinates uses the following equations:

$$\psi = MOD(\theta_i - \theta_{i-1}, 180°)$$

$$D = 2 \cdot \left( \frac{C_i}{\psi} \right) \cdot \sin\left( \frac{\psi}{2} \right)$$

$$x_i = x_{i-1} + D \cdot \cos\left( 90° - \left( \theta_{i-1} + \frac{\psi}{2} \right) \right)$$

$$y_i = y_{i-1} + D \cdot \sin\left( 90° - \left( \theta_{i-1} + \frac{\psi}{2} \right) \right)$$

where
   C is the distance traveled of the vehicle, and
   $\theta$ is the vehicle's compass heading.

4. The apparatus of claim 2, further comprising means for normalizing said dead-reckoned coordinates for a straight path according to the following equation:

$$\chi^2 = \sum_{i=1}^{n} \left[ \frac{(x_i - x_i' + U)^2}{\sigma_x^2} + \frac{(y_i - y_i' + V)^2}{\sigma_y^2} \right]$$

where (U,V) are the coordinate adjustment offsets.

5. The apparatus of claim 2, further comprising means for normalizing said dead-reckoned coordinates for a curved path according to the following equation:

$$\chi^2 = \sum_{i=1}^{n} \frac{[(x_i - x_i' + U) - (d + q \cdot F_i)\cos(\theta_i')]^2}{\sigma_x^2} + \frac{[(y_i - y_i' + V) - (d + q \cdot F_i)\sin(\theta_i')]^2}{\sigma_y^2}$$

where
   (U,V) are the coordinate adjustment offsets,
   d and q are the adjustment factors, and
   $F_i$ is the following function:

$$F_i = \sum_{j=i}^{n-1} ABS(MOD(\theta_j - \theta_{j+1}, 180°)).$$

6. The apparatus of claim 1, further comprising means for recording said navigation route and total distance traveled for later retrieval.

7. An apparatus for vehicle navigation and driving assistance, comprising:

a computer;

a road map database stored on said computer;

means for acquiring a vehicle's distance traveled and compass heading;

means for calculating the dead-reckoned coordinates from said vehicle's distance traveled and compass heading using the following equations:

$$\psi = MOD(\theta_i - \theta_{i-1}, 180°)$$

$$D = 2 \cdot \left( \frac{C_i}{\psi} \right) \cdot \sin\left( \frac{\psi}{2} \right)$$

$$x_i = x_{i-1} + D \cdot \cos\left( 90° - \left( \theta_{i-1} + \frac{\psi}{2} \right) \right)$$

$$y_i = y_{i-1} + D \cdot \sin\left( 90° - \left( \theta_{i-1} + \frac{\psi}{2} \right) \right)$$

where

C is the distance traveled of the vehicle, and $\Theta$ is the vehicle's compass heading;

means for acquiring the roadway projected coordinates from said road map database;

means for determining a probable navigation route for acquiring the next roadway projected coordinates from said map database using a sum-of-squares minimization according to the following equation:

$$\chi^2 = \sum_{i=1}^{n} \left[ \frac{(x_i - x_i')^2}{\sigma_x^2} + \frac{(y_i - y_i')^2}{\sigma_y^2} + \frac{(\theta_i - \theta_i')^2}{\sigma_\theta^2} \right]$$

where $(x_i', y_i')$ are the dead-reckoned coordinates of the $i^{th}$ measurement, $(x_i', y_i')$ are the roadway projected coordinates of the $i^{th}$ measurement, $\Theta_i$ is the heading from the $i^{th}$ measurement, $\Theta_i$ is the heading of the roadway at the location $(x_i', y_i')$, $\sigma_x$ and $\sigma_y$ are the statistical standard deviations of the dead-reckoned coordinate measurements, and $\sigma_\Theta$ is statistical standard deviation measuring the compass heading;

means for normalizing said dead-reckoned coordinates to said roadway projected coordinates for straight paths according to:

$$\chi^2 = \sum_{i=1}^{n} \left[ \frac{(x_i - x_i' + U)^2}{\sigma_x^2} + \frac{(y_i - y_i' + V)^2}{\sigma_y^2} \right]$$

where (U,V) are the coordinate adjustment offsets, or normalizing said dead-reckoned coordinates to said roadway projected coordinates for curved paths according to:

$$\chi^2 = \sum_{i=1}^{n} \frac{[(x_i - x_i' + U) - (d + q \cdot F_i)\cos(\theta_i')]^2}{\sigma_x^2} + \frac{[(y_i - y_i' + V) - (d + q \cdot F_i)\sin(\theta_i')]^2}{\sigma_y^2}$$

where d and q are the adjustment factors, and $F_i$ is the following function:

$$F_i = \sum_{j=i}^{n-1} ABS(MOD(\theta_j - \theta_{j+1}, 180°))$$

; and, means for displaying said normalized coordinates on a visual representation of said roadway to assist in determining said vehicle's current location.

8. The apparatus of claim 7, further comprising means for recording said navigation route and total distance traveled for later retrieval.

* * * * *